US012381951B2

(12) United States Patent
Sharma et al.

(10) Patent No.: US 12,381,951 B2
(45) Date of Patent: Aug. 5, 2025

(54) INTELLIGENT EDGE COMPUTING PLATFORM WITH MACHINE LEARNING CAPABILITY

(71) Applicant: Tyco Fire & Security GmbH, Neuhausen am Rheinfall (CH)

(72) Inventors: Abhishek Sharma, Mountain View, CA (US); Sastry K M Malladi, Fremont, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/666,601

(22) Filed: May 16, 2024

(65) Prior Publication Data
US 2024/0305689 A1  Sep. 12, 2024

Related U.S. Application Data

(63) Continuation of application No. 18/125,954, filed on Mar. 24, 2023, now Pat. No. 12,010,178, which is a
(Continued)

(51) Int. Cl.
*H04L 67/12* (2022.01)
*G06F 18/214* (2023.01)
(Continued)

(52) U.S. Cl.
CPC .......... *H04L 67/12* (2013.01); *G06F 18/2148* (2023.01); *G06F 18/251* (2023.01);
(Continued)

(58) Field of Classification Search
CPC .......... H04L 67/12; G06N 5/04; G06N 20/00; G16Y 40/20
See application file for complete search history.

(56) References Cited

U.S. PATENT DOCUMENTS 8,209,274 B1 *  6/2012  Lin .......................... G06N 3/08
706/21
8,572,155 B2  10/2013  Yanovich et al.
(Continued)

FOREIGN PATENT DOCUMENTS

CN      101860978 A    10/2010
CN      103024059 A    4/2013
(Continued)

OTHER PUBLICATIONS

Aazam et al., "Fog Computing and Smart Gateway Based Communication for Cloud of Things," 2014 International Conference on Future Internet of Things and Cloud, Aug. 27-29, 2014 (7 pages).
(Continued)

*Primary Examiner* — David R Lazaro
(74) *Attorney, Agent, or Firm* — Foley & Lardner LLP

(57) ABSTRACT

An edge computing platform with machine learning capability is provided between a local network with a plurality of sensors and a remote network. A machine learning model is created and trained in the remote network using aggregated sensor data and deployed to the edge platform. Before being deployed, the model is edge-converted ("edge-ified") to run optimally with the constrained resources of the edge device and with the same or better level of accuracy. The "edge-ified" model is adapted to operate on continuous streams of sensor data in real-time and produce inferences. The inferences can be used to determine actions to take in the local network without communication to the remote network. A closed-loop arrangement between the edge platform and remote network provides for periodically evaluating and iteratively updating the edge-based model.

20 Claims, 11 Drawing Sheets

Related U.S. Application Data continuation of application No. 16/379,700, filed on Apr. 9, 2019, now Pat. No. 11,616,839.

(51) Int. Cl.
*G06F 18/25* (2023.01)
*G06N 5/04* (2023.01)
*G06N 20/00* (2019.01)
*G16Y 40/20* (2020.01)
*H04L 67/00* (2022.01)

(52) U.S. Cl.
CPC ............... *G06N 5/04* (2013.01); *G06N 20/00* (2019.01); *G16Y 40/20* (2020.01); *H04L 67/34* (2013.01)

(56) References Cited

U.S. PATENT DOCUMENTS

| | | |
|---|---|---|
| 9,843,647 B2 | 12/2017 | Stenneth |
| 9,990,187 B1* | 6/2018 | Carroll .................. G06F 8/30 |
| 10,007,513 B2 | 6/2018 | Malladi et al. |
| 10,127,022 B2 | 11/2018 | Sharma et al. |
| 10,354,169 B1* | 7/2019 | Law .................. G06F 18/214 |
| 10,990,850 B1* | 4/2021 | Chen .................. G06V 10/7747 |
| 11,017,050 B1* | 5/2021 | Xu .................. H04L 43/0864 |
| 11,048,498 B2* | 6/2021 | Malladi .................. H04L 65/40 |
| 11,210,823 B1* | 12/2021 | Simeonov .......... G06Q 30/0201 |
| 11,295,241 B1* | 4/2022 | Badawy .................. G06N 5/022 |
| 11,301,762 B1* | 4/2022 | Chen .................. G06N 5/027 |
| 11,423,283 B1* | 8/2022 | Lupesko .................. G06N 3/04 |
| 11,616,839 B2* | 3/2023 | Sharma .................. G16Y 40/20 706/12 |
| 11,704,577 B1* | 7/2023 | Chen .................. G06N 3/082 706/12 |
| 12,010,178 B2* | 6/2024 | Sharma .................. G06N 5/04 |
| 2004/0002838 A1 | 1/2004 | Oliver et al. |
| 2006/0094443 A1 | 5/2006 | Dowling et al. |
| 2009/0055126 A1 | 2/2009 | Yanovich et al. |
| 2009/0228407 A1 | 9/2009 | Ramesh et al. |
| 2014/0047107 A1 | 2/2014 | Maturana et al. |
| 2014/0359552 A1 | 12/2014 | Misra et al. |
| 2015/0067791 A1 | 3/2015 | Matus |
| 2015/0244826 A1 | 8/2015 | Stenneth |
| 2015/0312125 A1 | 10/2015 | Subramanian et al. |
| 2015/0371465 A1 | 12/2015 | Garrett et al. |
| 2016/0065306 A1 | 3/2016 | Huang et al. |
| 2016/0146617 A1 | 5/2016 | Macfarlane |
| 2016/0217387 A1* | 7/2016 | Okanohara ............ G06N 20/00 |
| 2016/0217388 A1* | 7/2016 | Okanohara ............ G06N 20/00 |
| 2016/0247089 A1 | 8/2016 | Zhao et al. |
| 2017/0011298 A1 | 1/2017 | Pal et al. |
| 2017/0060574 A1* | 3/2017 | Malladi .................. H04W 4/70 |
| 2017/0091673 A1* | 3/2017 | Gupta .................. G06N 5/022 |
| 2017/0132817 A1* | 5/2017 | Mahajan ................ G06N 3/105 |
| 2017/0277560 A1 | 9/2017 | Lucas et al. |
| 2017/0277800 A1 | 9/2017 | Lucas et al. |
| 2018/0032908 A1* | 2/2018 | Nagaraju ............ G06F 11/3072 |
| 2018/0032915 A1* | 2/2018 | Nagaraju ............... G06V 10/95 |
| 2018/0300124 A1* | 10/2018 | Malladi .................. G06F 9/542 |
| 2019/0036716 A1* | 1/2019 | Kasaragod ............ H04L 63/104 |
| 2019/0197354 A1* | 6/2019 | Law ........................ G06N 3/04 |
| 2019/0197369 A1* | 6/2019 | Law ........................ G06N 3/082 |
| 2019/0369984 A1* | 12/2019 | Malladi .................. G06F 8/70 |
| 2019/0392328 A1* | 12/2019 | Gil Bulacio ............ H04L 63/16 |
| 2020/0084113 A1* | 3/2020 | Joshi ...................... G06N 20/00 |
| 2020/0151619 A1* | 5/2020 | Mopur .................... H04L 67/12 |
| 2020/0285983 A1* | 9/2020 | Bhattacharyya ....... G06N 20/10 |
| 2020/0311559 A1* | 10/2020 | Chattopadhyay ........ G06N 5/01 |
| 2020/0327371 A1* | 10/2020 | Sharma .................. H04L 67/34 |
| 2021/0133630 A1* | 5/2021 | Dalli ...................... G06N 5/045 |
| 2021/0312007 A1* | 10/2021 | Xu ........................ H04L 41/145 |
| 2021/0360070 A1* | 11/2021 | Cella ...................... H04L 67/565 |
| 2021/0382449 A1 | 12/2021 | Krishnan et al. |
| 2021/0382451 A1 | 12/2021 | Bharathi et al. |
| 2021/0382452 A1 | 12/2021 | Krishnan et al. |
| 2021/0382474 A1 | 12/2021 | Krishnan et al. |
| 2021/0389968 A1 | 12/2021 | Majewski et al. |
| 2022/0004445 A1 | 1/2022 | George et al. |
| 2022/0197306 A1 | 6/2022 | Cella et al. |
| 2023/0244996 A1 | 8/2023 | Kumar et al. |
| 2023/0300195 A1* | 9/2023 | Sharma .................. G06F 18/251 706/12 |
| 2024/0305689 A1* | 9/2024 | Sharma .................... G06N 3/08 |

FOREIGN PATENT DOCUMENTS

| | | | |
|---|---|---|---|
| CN | 103200249 A | 7/2013 | |
| CN | 108510082 A | 9/2018 | |
| CN | 108885545 A | 11/2018 | |
| WO | WO-2016/118815 A1 | 7/2016 | |
| WO | WO-2017/035536 A1 | 3/2017 | |
| WO | WO-2020209951 A1 * | 10/2020 | ............ G06N 20/00 |

OTHER PUBLICATIONS

Extended European Search Report on EP Appl. No. EP 20787657.4 dated Dec. 5, 2022 (10 pages).
Indian Office Action on IN Appl. No. 202137041010 dated Feb. 2, 2024 (6 pages).
International Search Report and Written Opinion for PCT App. Ser. No. PCT/US2020/020523 dated Aug. 27, 2020 (8 pages).
Saudi Arabia Examination Report on SA Appl. No. 521430262 dated Nov. 23, 2023 (16 pages with English language Translation).
Office Action on Chinese Appl. No. CN 202080027759.2 dated Mar. 29, 2025 (39 pages with English machine translation).

* cited by examiner

INTELLIGENT EDGE COMPUTING PLATFORM WITH MACHINE LEARNING CAPABILITY

CROSS-REFERENCE TO RELATED APPLICATIONS

The present application is a continuation of U.S. patent application Ser. No. 18/125,954 filed Mar. 24, 2023, which is a continuation of U.S. patent application Ser. No. 16/379,700 filed Apr. 9, 2019, which is incorporated by reference herein.

DESCRIPTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention relates to the field of computing, and more specifically to edge computing to handle the large amounts of data generated by industrial machines.

The invention relates to the field of intelligent computing, and more specifically to intelligent edge computing for processing and analyzing large volumes of sensor and other data in distributed network IoT environments in real-time to derive analytical meaning and predictive insights therefrom.

The Internet of Things (IoT) brings value to business operations through instrumentation of physical operations with high fidelity sensors, tracking events in operations with high frequency and turning sensor data into actionable analytic insights through software and services. However, the physical settings of day-to-day operations (like factories, warehouses, retail stores, and other facilities) are extremely heterogeneous in terms of sensor hardware, networking topology, data protocols, and data formats. This heterogeneity poses high cost overheads on software development, testing, and deployment; code modules need to be redeveloped for each combination of hardware-networking-data protocol-data format.

Further, local operations in distributed network Internet of Things (IoT) environments may encompass many different types of industrial machines and processes in many different business and technology sectors, including manufacturing, oil and gas, mining, transportation, power and water, renewable energy, health care, retail, smart buildings, smart cities, connected vehicles, and even consumer wearables. In an IoT environment, and particularly in an Industrial Internet of Things (IIoT) environment, numerous sensors and other data-generating sources may be deployed in connection with an enterprise's local physical operations to detect and track various physical conditions, occurrences, and events continuously or at very high frequency, or any combination of these. Such sensors and data-generating sources can produce very large volumes of raw data that require processing and analysis to be useful. Further, with the costs of sensors and network technology declining, the number and distribution of sensors in local networked operations is growing rapidly.

In an IoT environment, enterprises may rely on remote data center or "cloud" infrastructure to host the computing infrastructure and software applications needed to process and analyze the locally generated sensor and device data in order to exploit economies of scale and system efficiencies. However, remote cloud-based computing and storage solutions have a number of shortcomings. For one, remote data centers can be arbitrarily distant from the locations where an enterprise physically conducts its business operations (e.g., factories, warehouses, retail stores, and others) and where large volumes of sensor and device data may generated. It generally is not practical to transfer such large volumes of data generated locally to a remote cloud computing or storage site, or a combination. Connectivity may not always be present or available. Even if connectivity is available, the available bandwidth is likely to be insufficient for the volumes of data generated. And, even if sufficient bandwidth is available, it is likely to be cost prohibitive considering the volumes of data to be transferred.

For another, even if connectivity, bandwidth, and cost were not issues, remote cloud-based computing and storage sites cannot process and analyze the data generated in local environments in real-time, make decisions based thereon, and provide potentially critical guidance or warnings back to the local environments in a timely manner. For example, by the time a cloud-based computing site receives, processes, and analyzes the data from a sensor monitoring a machine in an enterprise's local facility, determines that operating characteristics of the machine have reached a limit requiring immediate intervention, or predicted a need for maintenance, and communicates that information back to the local environment, the machine may already have suffered significant damage.

In addition, the high volume, diversity, and complexity of streaming sensor and device data that is generated locally presents challenges for interpreting the data and obtaining predictive and other insights therefrom. Cloud-based data mining and machine-learning model generation, training, and application can be brought to bear. However, cloud-based machine learning lacks real-time responsiveness that may be critical in some situations in local environments. Additionally, without the context provided by the local domain or "tribal" knowledge of persons working in or otherwise familiar with, a local environment or operation, e.g., the knowledge of people working in a local factory or plant, it is nearly impossible to obtain usable insights even if the entirety of the available data could be transmitted to and analyzed in the cloud. However, implementing machine learning at the edge where locally-generated data can be received and acted on directly, in real-time, with local context, and without awaiting transmission to a remote cloud site would allow actionable insights to be derived from the locally-generated data and made available for use locally substantially in real-time.

Because typical machine learning models are adapted to operate in a cloud environment, a number of challenges must be overcome to successfully implement and adopt machine learning at the edge. Typical cloud-based machine learning models require substantial computing capacity whereas edge-based computing platforms generally have limited computing capacity available. Typical cloud-based machine learning models also operate well on batched data, such as is typically stored in cloud-based storage, but are not able to function in real-time on high velocity, high volume streaming data, such as is typically produced by the sensors in industrial and other IoT environments. Also, typical cloud-based machine learning models operate well on data that has been pre-processed to eliminate errors and gaps, that has been normalized, and others, but may not provide accurate results from raw sensor data. Further, because typical cloud-based machine learning models operate on batched data, they may not execute efficiently or rapidly enough to keep up with the high rates and volumes of streaming data typically generated in industrial and other IoT environments. Still further, while typical cloud-based machine learning models may be easily updated or tuned in the cloud as additional batches of data are received and analyzed, a different approach is required for updating remote edge-based machine learning models.

Therefore, there is a need for improved computing systems, architectures, and techniques in the IoT environment. More specifically, there is a need for an improved intelligent edge computing platform with machine learning capability for use in various IoT environments to efficiently and effectively receive, process, and analyze locally-generated, high-rate, high-volume streaming data, derive analytical meaning and predictive insights therefrom, and take appropriate local actions, all in real-time and without the need to transfer data to a remote cloud or other facility for processing and analysis. There also is a need for such an edge platform on which machine learning applications are able to execute efficiently and effectively with limited compute and storage resources available. There also is a need for such an edge platform that facilitates the dynamic mobility and continuous re-training of machine learning applications between the edge and cloud. There also is a need for such an edge platform that provides for managing software and data in highly heterogeneous sensor, network, data format, and data protocol settings. There also is a need for such an edge platform that facilitates the development, training, evaluation, deployment, and updating of machine learning models for the edge efficiently in conjunction with remote cloud resources.

BRIEF SUMMARY OF THE INVENTION

A system and method provides an edge computing platform with machine learning capability. In one aspect, the system and method provide an edge computing platform with an executable machine learning model that has been adapted or "edge-ified" to operate within the constraints of the edge computing environment to receive and process one or more streams of sensor data and produce one or more streams of inferences in real-time. In another aspect, the system and method provide a closed loop arrangement for continuously evaluating the accuracy of the model on the edge-computing platform, generating an updated or modified model, and iteratively updating or replacing the model on the edge computing platform to improve accuracy. In yet another aspect, the system and method provide for updating a model on the edge computing platform non-disruptively without interrupting the real-time processing of any data by the model. In still another aspect, the system and method provide for the seamless chaining, orchestration, and pipelining of multiple edge-based machine learning models. In other aspects, the system and method provide support for the execution of heterogeneous models and for dynamic selection and execution of models based on the detection of semantics in the data streams.

An edge computing platform with machine learning capability is provided between a local network with a plurality of sensors and a remote network. A machine learning model is created and trained in the remote network using aggregated sensor data and deployed to the edge platform. Before being deployed, the model is edge-converted ("edge-ified") to run optimally with the constrained resources of the edge device and with the same or better level of accuracy. The "edge-ified" model is adapted to operate on continuous streams of sensor data in real-time and produce inferences. The inferences can be used to determine actions to take in the local network without communication to the remote network. A closed-loop arrangement between the edge platform and remote network provides for periodically evaluating and iteratively updating the edge-based model. The edge-based model is updated without interrupting the processing of sensor stream data by defining the model as a continuous stream that flows with the sensor data streams. Multiple edge-based models communicate and are chained using a topic-based publish-subscribe infrastructure.

In an implementation of one aspect of the invention, an edge computing platform is provided in a distributed network having a local network with a plurality of sensors and devices, and a remote cloud network. The edge computing platform is connected to the local network between the sensors and the remote cloud network. A remotely-developed machine learning model that has been edge-converted ("edge-ified") to execute at the edge is installed on the edge computing platform. The edge computing platform receives a first sensor data stream from a first sensor of the plurality of sensors. Without first transmitting the first sensor data stream to the remote cloud network for processing, the machine learning model operates on the first sensor data stream and produces a stream of first inferences about a first network device in real-time. A determination may be made from the inferences whether to take an action affecting the first network device.

In an implementation, the machine learning model may be generated remotely in a high-level machine learning programming language such as Python, R, or Java using machine learning frameworks like XGBoost, TensorFlow, Caffe, Torch, and others. The model may then be edge-converted or "edge-ified" to specifically execute at the edge. The conversion may include first translating the model into an intermediate form such as Predictive Modeling Markup Language (PMML) for deployment. The intermediate form may then be converted into a script of analytics expressions of an expression language, such as VEL®, that is adapted to operate with constrained resources on a continuous stream of data in real-time and to produce a continuous stream of inferences. The model also may be converted and optimized for execution at the edge directly from the high-level language without first translating it to an intermediate form and without converting it to a script of VEL® expressions.

In an implementation, the machine learning model may be developed and initially trained using stored aggregated sensor data with the same semantics as the continuous streams of data to be received and processed by the edge-converted machine learning model at the edge.

In an implementation, the machine learning model may include a data pre-processing component or a data post-processing component, or both. One or both of these components may be replaced with equivalent expressions of the expression language separate from the model as part of converting the model for execution at the edge.

In an implementation, the remotely developed and edge-converted machine learning model may be deployed to the edge computing platform either directly via cooperating cloud and edge managers, or indirectly via an intermediate app store.

In an implementation, edge-converting the model may include parsing the high-level language or intermediate PMML version of the model, identifying the computations it contains and building a computation flow graph in memory. The computations may be optimized and any data preprocessing computations may be removed. If the model is to be converted to a script of analytics expressions of an analytics expression language, the expressions necessary to carry out the optimized computations may be identified and assembled for inclusion in the script.

In an implementation, edge-converting the model may include verifying the edge-converted model produces accurate results compared to the high-level language or PMML version for a given set of data values. In one particular implementation, model verification tags may be parsed from a PMML version of the model. A first set of input data values and a first set of expected output data values corresponding to the verification tags may be extracted from the PMML version of the model. The PMML version of the model may be translated to equivalent expressions of an analytics expression language, such as VEL®. The first sets of input data values and expected output data values may be converted to a form compatible with the analytics expression language. The script of expressions of the analytics expression language may be executed on the second set of input data values and a set of actual output values produced. The actual data output values may be compared to the second set of expected output data values.

In an implementation of another aspect of the invention, a closed-loop arrangement for continuously updating the edge-converted model on the edge computing platform is provided. In this arrangement, one or more of the first inferences produced by the edge-converted model and one or more data points from the first sensor data stream may be transmitted to the remote cloud network for evaluation. At the remote cloud network, the inferences may be evaluated for accuracy using a remote version of the edge-converted machine learning model that is trained and adapted to operate on a stored aggregated set of the first sensor data. The remote version of the model may be applied to one or more data points from the first sensor data stream to produce one or more second inferences. The one or more first and second inferences produced by the edge-converted model and the remote version of the model may be compared for accuracy.

Based on the evaluation, a modified machine learning model may be generated. The modified machine learning model may be edge-converted and deployed to the edge computing platform. At the edge computing platform, the original edge-converted model may be replaced or updated with the modified edge-converted model without any disruption at the edge.

Thereafter, the process may continue with the model on the edge computing platform being updated or replaced by a modified edge-converted model from time to time so that the inferences produced from the sensor data received and processed by the model on the edge-computing platform become more and more accurate over time.

A model update cycle may be initiated by a trigger, which may comprise a manual trigger, a time-based trigger, or a trigger derived from evaluating inferences generated by the model at the edge. Analytics expressions implementing selected logic, math, statistical or other functions may be applied to a stream of inferences generated by the model on the edge platform. The analytics expressions define what constitutes an unacceptable level of drift or degradation of model accuracy and track the model output to determine if the accuracy has degraded beyond an acceptable limit. In response, the edge platform can automatically take action, such as recording raw sensor data and sending it with the corresponding inferences to the cloud for re-training or re-evaluation, or both, of the model.

In an implementation of another aspect of the invention, dynamic non-disruptive machine learning model update and replacement on the edge computing platform is provided. In this aspect of the invention, a machine learning model on the edge computing platform may be updated with a modified machine learning model without interrupting the model processing a continuous sensor data stream or producing a stream of inferences based thereon.

On the edge computing platform, a continuous model stream may be generated representing the edge-based machine learning model. The model stream may stream on the edge computing platform along with the first sensor data stream. The edge computing platform may receive a modified machine learning model. The modified machine learning model may be inserted into the model stream. A change in the model stream corresponding to the modified machine learning model may be detected as the modified machine learning model propagates down the model stream. In response to detecting the change in the model stream, an instance of the modified machine learning model may be instantiated. The instantiated instance of the modified machine learning model may then be used to operate on the first sensor data stream and to produce inferences from that point forward in place of the original edge-based machine learning model.

In a particular implementation, a stateful subsystem may be used to detect the change in the model stream in real-time. In response, an actor may be triggered that understands the semantics of the model stream. The actor may read the modified machine learning model from the model stream, instantiate the instance of the modified machine learning model, couple the instantiated instance of the modified machine learning model to the same semantics of the first sensor data stream as the original edge-based machine learning model, and insert the instantiated instance of the modified machine learning model back into the model stream.

In an implementation of yet another aspect of the invention, seamless communication and chaining of multiple machine learning models on the edge computing platform using a topic-based publish-subscribe infrastructure is provided. In an implementation, the edge computing platform includes a data bus. A plurality of machine learning model topics with individual topic names are defined. Each topic name may represent one or more streams flowing on the data bus with each stream comprising data points, passage of time tokens, or control triggers. The stream or collection of streams represented by a topic name may be accessible by the machine learning model by subscribing or publishing to the topic name.

The edge computing platform may receive a first sensor data stream from a first sensor of the plurality of sensors. The first sensor data stream flows on the data bus with a first selected topic name and may be accessed by a first edge-based machine learning model by subscribing to the first topic name. Without first transmitting the first sensor data stream to the remote cloud network for processing, the first machine learning model may operate on the first sensor data stream and produce a stream of first inferences about one or more of the network devices. The stream of first instances may flow on the data bus by the first machine learning model publishing the stream of first instances with a second topic name. A second edge-based machine learning model may access the stream of first inferences by subscribing to the second topic name, operate on the stream of first inferences, and produce a stream of second inferences about one or more of the plurality of network devices. A determination may be made from the stream of second inferences whether to take an action affecting one or more of the network devices. Thus, multiple edge-based machine learning models may seamlessly communicate and be chained to produce a desired result using a topic-based publish-subscribe infrastructure.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
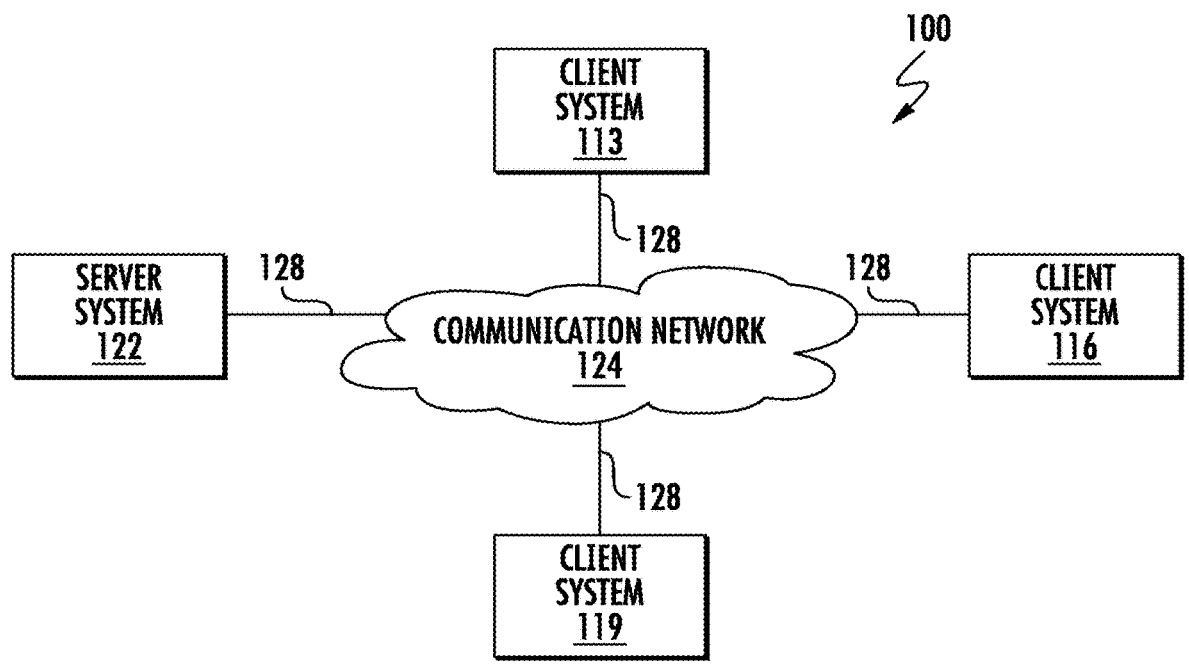
FIG. 1 shows a block diagram of a client-server system and network.

FIG. 1 is a simplified block diagram illustrating a distributed computer network 100 incorporating an example embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may comprise hardwire links, optical links, satellite or other wireless communications links, wave propagation links, or any other mechanisms for communication of information. Communication links 128 may comprise DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. Communication protocols may include VLAN, MPLS, TCP/IP, tunneling, HTTP and related protocols, wireless application protocol (WAP), vendor-specific protocols, customized protocols, and others. While in one embodiment, communication network 124 comprises the Internet, in other embodiments, communication network 124 may comprise any suitable communication network including a local area network (LAN), a wide area network (WAN), a wireless network, an intranet, a private network, a public network, a switched network, or a combinations of these, and the like.

It will be appreciated that distributed computer network 100 is merely illustrative of an example embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems, such as client systems 113, 116, and 119, typically request information from a server system, such as server system 122, which provides the information. For this reason, server systems typically have more computing and storage capacity than client systems. However, a particular computer system may act as both a client and a server depending on whether the computer system is requesting or providing information. Additionally, although aspects of the invention have been described in the context of a client-server environment, it should be apparent that the invention may also be embodied in a standalone computer system.

Server system 122 is responsible for receiving information requests from client systems 113, 116, and 119, performing processing required to satisfy the requests, and forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific example embodiment, the client systems can run as a standalone application, such as a desktop application or a mobile smartphone or tablet application. In another example embodiment, a "web browser" application executing on a client system can enable users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others. It will thus be appreciated that client systems 113, 115, and 119, as well as server system 122, can comprise hardware, software, or firmware, or a combination of such components.

In a client-server distributed network environment, some resources (e.g., files, music, video, or data) may be stored at the client while others may be stored at or delivered from elsewhere in the network, such as a server, and may be accessible via the network (e.g., the Internet). Therefore, a user's data may be stored remotely from the user's location in the network or "cloud." For example, the user can employ a local client device to work on documents that are stored remotely on the cloud (e.g., server). Local data on the client device may be synchronized with the remote data stored in the cloud.

Figure 2:
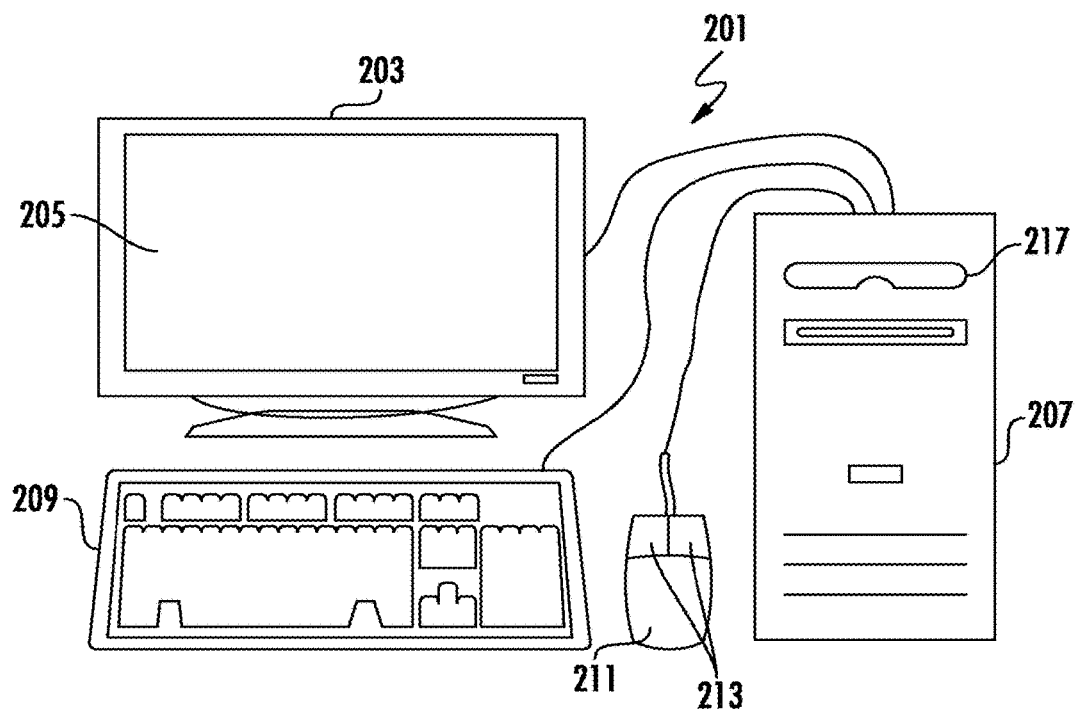
FIG. 2 shows a more detailed diagram of a client or server.

FIG. 2 shows an exemplary client or server system of the present invention comprising a computer workstation system 201. In an example embodiment, a user may interface with the distributed computer network through the computer system 201. The computer system 201 may include an enclosure 207 (which also may be referred to as a system unit, cabinet, or case), and one or more peripherals, including for example a monitor 203, screen 205, keyboard or other human input device 209, and mouse or other pointing device 211. Mouse 211 may have one or more buttons such as mouse buttons 213.

It should be understood that the present invention is not limited with respect to any computing device in a specific form factor (e.g., desktop computer form factor), and that the example client and server systems can include and use all types of computing devices in various form factors. For example, a user can interface with a client or server system comprising any type of computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as an Apple iPhone (e.g., Apple iphone 6), Apple iPad (e.g., Apple iPad or Apple ipad mini), Apple iPod (e.g., Apple ipod Touch), Samsung Galaxy product (e.g., Galaxy S series product or Galaxy Note series product), Google Nexus device (e.g., Google Nexus 6, Google Nexus 7, or Google Nexus 9), or Microsoft device (e.g., Microsoft Surface tablet). Typically, a smartphone includes a telephony portion (and associated radios) and a computer portion, which are accessible via a touch screen display. In addition, there typically is nonvolatile memory to store data of the telephone portion (e.g., contacts and phone numbers) and the computer portion (e.g., application programs including a browser, pictures, games, videos, and music). A smartphone also typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product incorporating the invention or aspects thereof may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Non-volatile media may include, for example, flash memory, or optical or magnetic disks. Volatile media includes static or dynamic memory, such as cache memory or RAM.

Transmission media may include, for example, coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version of software incorporating the present invention or aspects thereof may be stored or reside in RAM or cache memory, or on mass storage device 217. The source code of the software may also be stored or reside on mass storage device 217 (e.g., hard disk, magnetic disk, tape, or CD-ROM). As a further example, code incorporating the invention or aspects thereof may be transmitted via wires, radio waves, or through a network such as the Internet.

Figure 3:
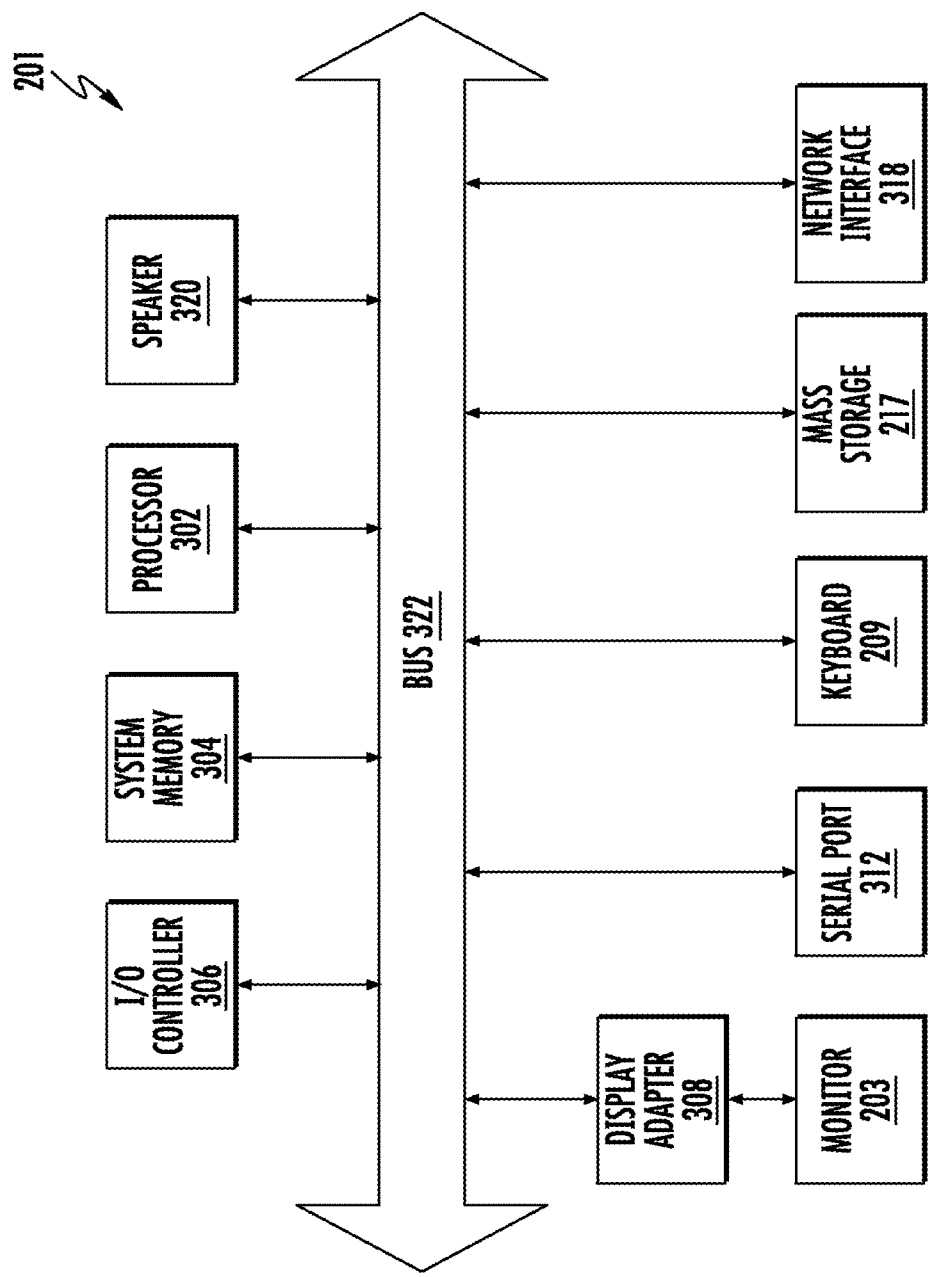
FIG. 3 shows a system block diagram of a computer system.

FIG. 3 shows a system block diagram of an example computer system 201 that may be used to execute software incorporating the present invention or aspects thereof. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial port 312 (which may also be a universal serial bus (USB), parallel data, or other data port), network interface 318, and speaker 320. The invention may also be used with computer systems with additional or fewer subsystems. For example, a computer system could include more than one processor 302 (i.e., a multiprocessor system) or could include a cache memory, or a combination.

Double-headed arrow 322 represents the system bus architecture of computer system 201. However, the arrow is illustrative of any interconnection scheme serving to link the various subsystems of the computer system. For example, speaker 320 could be connected to the other subsystems through a port or have an internal direct connection to central processor 302. The processor 302 may include multiple processors or a multicore processor, which may permit parallel processing of information. Computer system 201 is but an example of a computer system suitable for use with the present invention. Other configurations of subsystems suitable for use with the present invention will be readily apparent to one of ordinary skill in the art.

Computer software and software products incorporating the invention or aspects thereof may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails and may be deployed to various computing platforms in these or other forms, such as XML, PMML, or VEL® by FogHorn Systems, Inc., or a combination. The computer software and software products may comprise one or more independent applications and the applications may have data input, data display, or data display modules, or a combination. Alternatively, the computer software and software products may comprise classes that may be instantiated as distributed objects. The computer software and software products may also comprise component software such as Java Beans (from Oracle Corporation) or Enterprise Java Beans (EJB from Oracle Corporation).

Any suitable operating system may be used with the computer system, including one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple IOS, Android, Alpha OS, AIX, IRIX32, or IRIX64. Other operating systems also may be used. (Microsoft Windows is a trademark of Microsoft Corporation.)

Furthermore, the computer system may be connected to a network and may interface to other computers using the network. The network may comprise one or more of an intranet, internet, or the Internet, among others. The network further may comprise a wired network (e.g., using copper), telephone network, packet network, an optical network (e.g., using optical fiber), or a wireless network, or any combination of these. For example, data, signals, and other information may be transferred or passed between the computer and other computers or components (or steps) of a system incorporating the invention or aspects thereof wirelessly over a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UNITS, UMTS-TDD, 1×RDD, and EV-DO), or others.

In an example embodiment, with a web browser executing on a computer workstation system, a user may access a system on the World Wide Web (WWW) through a network such as the Internet. The web browser may be used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, a user may access the system through either or both of native and non-native applications. Native applications are locally installed on a particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system also can be accessed via platform-independent, non-native applications. For example, a user or client may access the system through a web application from one or more servers, using a network connection with the server or servers to load the web application in the user's or client's web browser. For example, a web application can be downloaded from an application server over the Internet by a web browser. Non-native applications can also be obtained from other sources, such as a disk.

Edge Computing Platform

Figure 4:
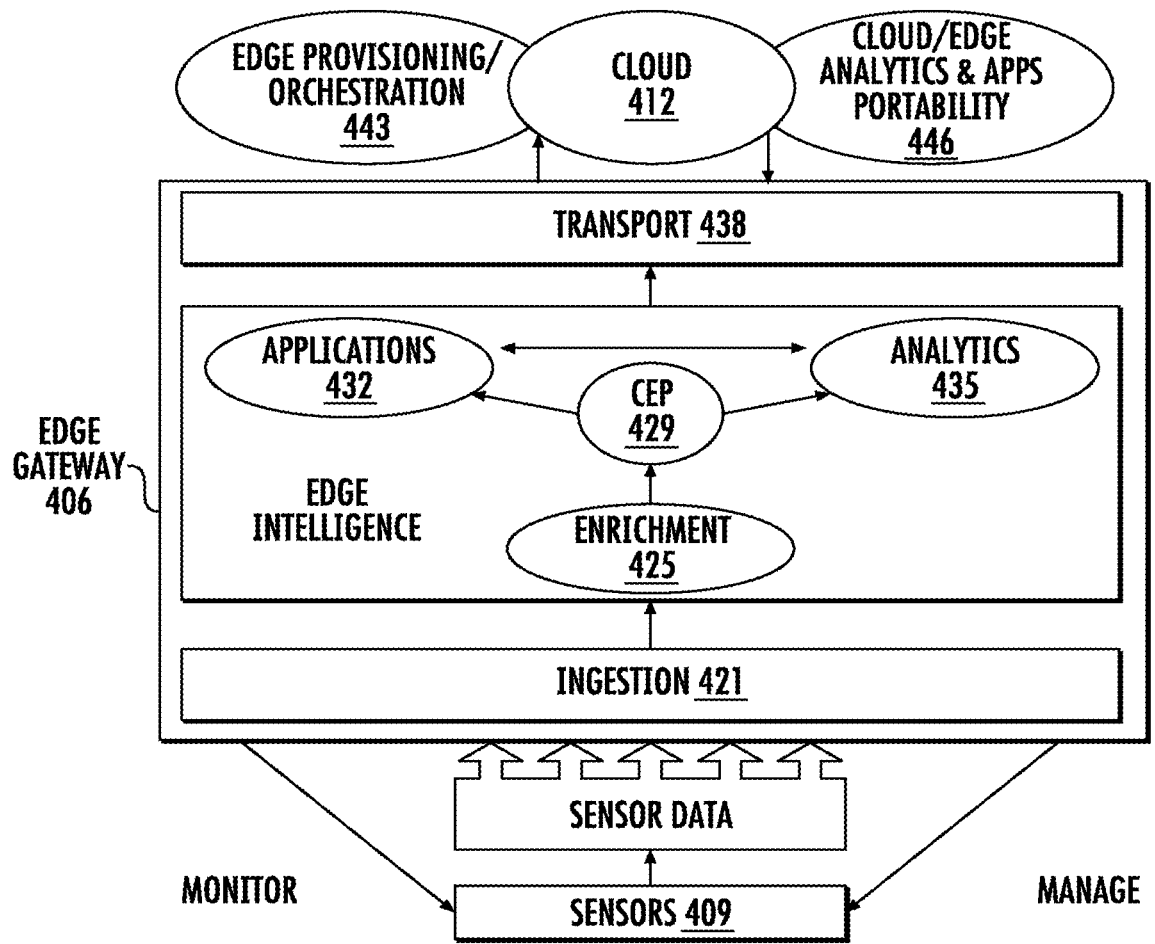
FIG. 4 a block diagram of an edge computing platform, which is between sensor streams and the cloud.

FIG. 4 shows a block diagram of an example improved intelligent edge computing platform 406. It is anticipated that the edge computing platform will typically run on an edge gateway or equivalent that is between sensors 409 and cloud 412. It is to be understood that while the edge computing platform may comprise a stand-alone platform, it also may be embedded in or combined with one or more other edge components, subsystems, devices, machines, and others. It is also to be understood that the edge computing platform and individual components thereof may be implemented in software, hardware, firmware, embedded hardware, standalone hardware, application specific-hardware, or any combination of these. Still further, the example platform can be deployed in different form-factors across cloud, medium-sized compute servers and miniaturized compute servers. For example, the platform may be hosted on compute infrastructure comprising, for example, a medium-sized server (e.g., a dual-core processor and 4 gigabytes of memory) or a miniaturized server (e.g., a single core processor core with less than 1 gigabyte of memory) collocated in the sensor-containing network. Preferably, regardless of the compute environment in which the edge computing platform is implemented, edge applications on the platform, which are described further below, can use the same set of application program interfaces (APIs) to accomplish data management, data analytics, and administrative tasks with respect to an enterprise's local physical operations.

As will be apparent, it is preferred in a distributed network IoT context that the intelligent edge computing platform be located at or relatively close to the edge of the local network or networks that have physical sensors 409 and other devices generating data to be processed and analyzed and devices and systems to be controlled as compared to the remote cloud-site 412. By hosting high performance real-time data processing, data analytics, and heterogeneous applications at the edge closer to the physical sensors, devices, and control systems of the local networks, the intelligent edge computing platform can generate edge intelligence from the sensor and other data effectively in real-time. The edge intelligence can be used to accomplish real-time closed loop device control, management, and optimization. In an Industrial Internet of Things (IIoT) environment, for example, this can effectively bring the benefits of big data and real-time processing capabilities on-site, which can be invaluable for industrial customers in manufacturing, oil and gas, power and water, transportation, mining, renewable energy, smart city, and other sectors.

The sensors 409 illustrated in FIG. 4 may be, for example, a plurality of physical sensors connected in a local network or multiple interconnected local networks of an enterprise's physical operation or operations. In other example embodiments, a variety of sensors 409 may be spread among various networks over a wide area and applications of the edge platform 406 may access data from some or all of the sensors, and provide real-time responses and messages based on data and analytics derived from the sensor data. It is to be understood that throughout the description herein references to "sensors" are intended to encompass not only traditional sensors, such as pressure and temperature sensors, but also other devices, logic, and transducers that are capable of generating continuous streams of data, including for example video cameras, audio microphones, and others.

The cloud 412 may comprise, for example, a remote data center, remote computing, or remote storage site, or a combination. The edge computing platform operates to derive edge intelligence from data, some or all of which may be generated by the sensors or other data-generating sources in the enterprise's local network or interconnected networks. The edge intelligence provides important information, for example information that can be used for managing, maintaining, and optimizing the performance of industrial machines and other industrial components in an IIoT environment.

Components of the example edge gateway platform 406 include the following: ingestion component 421, enrichment component 425, complex event processing (CEP) engine 429, applications 432, analytics component 435, and transport component 438. The cloud can include edge provisioning and orchestration components 443 and cloud and edge analytics and apps portability components 446.

The data ingestion component 421 receives multiple streams of data on multiple network interfaces at the edge layer and preferably recognizes and accepts sensor and other IoT data in accordance with various established data ingestion protocols (e.g. OPC-UA, Modbus, MQTT, DDS, and others) as well as other suitable data transfer protocols. In addition, the ingestion component should be able to incorporate custom protocol adaptors to recognize custom protocols, for example proprietary protocols defined by particular sensor manufacturers or by the owners or operators of particular local networks. Further details of the ingestion component are described below.

The enrichment component 425 receives the data ingested by the ingestion component 421 and enriches or pre-processes it. For example, the enrichment component may provide one or more and any combination of data decoding, data error detection and correction, out-of-bounds data detection and handling, missing data detection and handling, metadata decoration, data normalization, or other data processing, or a combination, on the ingested data streams prior to the data being provided to the edge intelligence components. With respect to audio and video data, enrichment may also include image resizing, timestamping, color to grayscale conversion, up and down sampling, packing and unpacking, application of certain codecs, and others. The enrichment processes are preferably performed in real-time on the ingested data streams preferably by applying selected VEL® expressions thereto. VEL® is described in further detail below. The same or different enrichment processes may be applied to individual streams of data and the enrichment component also may mix or otherwise combine multiple incoming streams to create additional enriched data streams for use by various edge applications, for example.

The edge applications 432 preferably reside and execute on the intelligent edge platform 406 itself. However, as described further below, it is preferred that the applications are self-contained with all the resources they require for execution so that they also can reside and execute on other computing platforms with potentially different resources, such as a remote computing platform in the cloud or a computing platform in the local or other network if desired. The applications can access the sensor and IoT device data generated in the local network that has been ingested by the ingestion component 421 and enriched by the enrichment component 425. The applications may access the sensor stream data in real-time and also may access sensor data that has been aggregated in batch mode.

The applications can be triggered by or receive input, or both, from the complex event processing (CEP) engine 429, also referred to as the analytics engine, which is preferably adapted to run on low footprint machines. The applications also have access to the analytics component 435 to obtain or contribute, or both, intelligence or other analytical information, or both, derived from or related to the sensor data and other data.

The ingested and enriched sensor data may be aggregated and stored in a local storage repository on the edge platform 406, which is described further below. The transport component 438 can be invoked to transfer or publish the ingested and enriched sensor data to the remote cloud 412 for offline storage, processing, or analysis, or a combination. However, as noted previously, many industrial environments and devices lack Internet connectivity. In addition, even with Internet connectivity, the sheer amount of data generated could easily exceed available bandwidth or be too cost prohibitive to send to the cloud. In addition, by the time the data is uploaded to the cloud, processed in a data center, and the results transferred back to the edge, it may be too late to take action in the local network that the data indicated to be necessary or desirable. Nevertheless, if Internet or other connectivity between the edge platform and the cloud is available, the ability to transfer sensor data from a local network to the cloud can be very useful in connection with developing, training and evaluating machine learning models and applications, as further discussed herein.

The data analytics components of the edge platform include the complex event processing (CEP) engine 429 and an analytics component 435. The analytics component comprises an expression language for providing data analytics, stream processing, or both, data aggregation, definition and application of rules, and definition, selection, and application of machine learning workflows at the edge. The complex event processing (CEP) engine 429 is also referred to as an analytics engine and preferably comprises a highly miniaturized and powerful domain specific language (DSL) execution engine. The DSL preferably comprises a real-time expression language, such as the VEL® expression language by FogHorn Systems, Inc. (FogHorn), that is adapted and suitable for processing data streams and deriving analytics and intelligence therefrom in real-time. In addition to being available from FogHorn, aspects of the VEL® language and various tools related thereto, such as a compiler and debugger, are described in FogHorn's U.S. patent application Ser. No. 15/250,720 (now U.S. Pat. No. 10,007,513); Ser. No. 15/467,306; 15/467,313 and 15/467,318 (now U.S. Pat. No. 10,127,022), which are incorporated by reference. The DSL is used to express rules and analytical functions that are executable by the engine with respect to potentially a multitude of incoming sensor data streams. Output from the executed DSL expressions can be made available to and can be used immediately by the applications or otherwise to take actions, provide warnings, and others in real-time with respect to conditions or occurrences in the local network as indicated by the sensor data. This can prevent costly machine failures or downtime as well as improve the efficiency and safety of industrial operations and processes in real-time and without awaiting processing and analysis of the data at a remote cloud site.

As illustrated in FIG. 4, the cloud 412 may comprise cloud/edge analytics and applications portability 446 functionality. In addition, as described in further detail below, the intelligent edge platform may include capabilities for developing and deploying heterogeneous applications on the edge platform and to facilitate dynamic mobility of applications between the edge and the cloud. Thus, applications may be developed on the edge platform, in the cloud, or on other edge platforms, or a combination, of a distributed network system. The applications may be deployed on the edge platform on which they were developed, in the cloud, or on other edge platforms. In that regard, applications preferably are developed using techniques, such as containerization, that render them dynamically mobile across the cloud and edge. Numerous different applications may be developed and deployed between the cloud and the edge for execution on the ingested enriched data of the edge platform, including advanced machine learning (ML) applications and models.

An application store, described in more detail below, also may be used to facilitate deployment of containerized applications to the edge.

As referred to above, the intelligent edge platform incorporates both hardware and software components at the edges of the local networks where IoT and IIOT devices reside. An edge software stack comprises a combination of software services that may run on the edge and in the cloud. A portion of the edge software stack provides services responsible for ingesting streaming data from sensors and network devices, such as industrial machines, as part of the ingestion component 421. As described further below, the data is ingested onto a high speed data bus from which it can be operated on by user-defined analytics expressions executed by the CEP component 429 to gain insights, control and optimize network devices, provide notifications or warnings, or a combination, and others.

The edge software stack services also may include a local time-series database in which sensor and other data may be aggregated locally and from which applications can make time-based sensor data queries. The services also may include a publishing function as part of the transport component 438 for sending such aggregated data to the cloud, where it may be used to create, train, evaluate, and update machine learning models among other things.

The edge software services also may include a polyglot software development kit (SDK) for developing the mobile self-contained edge applications that can execute on the edge platform, in the cloud, or both as referred to above. Preferably, the developed applications are able to consume data both in stream and batch modes.

As also illustrated in FIG. 4, the cloud 412 may comprise edge provisioning and orchestration 443 functionality. Such functionality incorporates a remote management console backed by microservices to remotely manage various hardware and software aspects of one or more edge computing platforms in communication with the cloud. Using this functionality, multiple different edge installations can be configured, deployed, managed and monitored via the remote management console. It will be appreciated that although the edge provisioning and orchestration 443 is shown in FIG. 4 as comprising part of the cloud 412, the same remote management and control functionality can be incorporated either alternatively to or in addition to the cloud in the local network to which the edge computing platform is connected, or to any other network or computing platform in communication with the edge computing platform.

Correspondingly, the edge software services also may include management services and a management console with a user interface (UI). The management services may reside and run on the edge platform, in the cloud, on on-premises computing environments, or a combination of these. The management services provide for remotely deploying, setting up, configuring, and managing edge platforms and components, including resource provisioning. The management services also may manage, for example, developing, deploying and configuring applications and analytics expressions. For example, management services may employ an application known as Docker (www.docker.com) to facilitate developing and deploying containerized analytics expressions and applications to edge platforms. The management services also preferably comprise services for managing the integration of the edge services with a customer's own identity access management and persistence solutions.

Further, the edge management services incorporate the capability to translate machine learning models that were developed in the cloud or elsewhere, and that are desired to be deployed to the edge, into optimized edge-converted models that are suitable for execution on the edge computing platform on continuous streaming data in real-time. This translation enables models that would otherwise require substantial compute and storage assets to execute efficiently in an edge computing environment with constrained compute and storage resources. This enables powerful machine learning capability to be embedded not only in stand-alone edge computing platforms, but also into a large variety of other edge devices having small footprints and constrained compute and storage resources.

By maintaining the edge platform and the various services it provides in relatively close proximity to the edge sensors and other devices that generate data, the data can be effectively processed and analyzed locally and in real-time rather than sending it to a distant centralized cloud. This minimizes latency and allows for maximum performance, faster response times, and more effective maintenance and operational strategies. It also significantly reduces overall bandwidth requirements and the cost of managing widely distributed networks.

As examples, an application executing on an example intelligent edge platform according to the invention may monitor and analyze locally and in real-time sensor data from pumps in an industrial IIoT environment. In one example, based on the real-time analysis of the data, which may include the use of machine learning models, an application may output in real-time a predictive maintenance schedule for the pumps, or may automatically take action in the local network to redirect flow around a pump to prevent costly damage due to a cavitation or other event detected or predicted. In another example, an application may monitor a wind energy management system and may output recommendations or automatically take action to alter operating parameters to maximize power generation, extend equipment life, and apply historical analysis for accurate energy forecasting.

In addition to the proximity and latency issues described above, the physical settings of day-to-day operations like those identified above, and other factories, warehouses, retail stores, and other facilities, are extremely heterogeneous in terms of sensor hardware, networking topology, data protocols, and data formats. Such heterogeneity can result in high software development, testing, and deployment costs. For example, in many instances it may be necessary to develop similar but separate code modules to perform duplicative functions for each combination of hardware-networking-data protocol-data format. The present system and method avoid such issues by employing layers of digital abstraction between the sensors and the applications executing on the edge computing platform.

Figure 5:
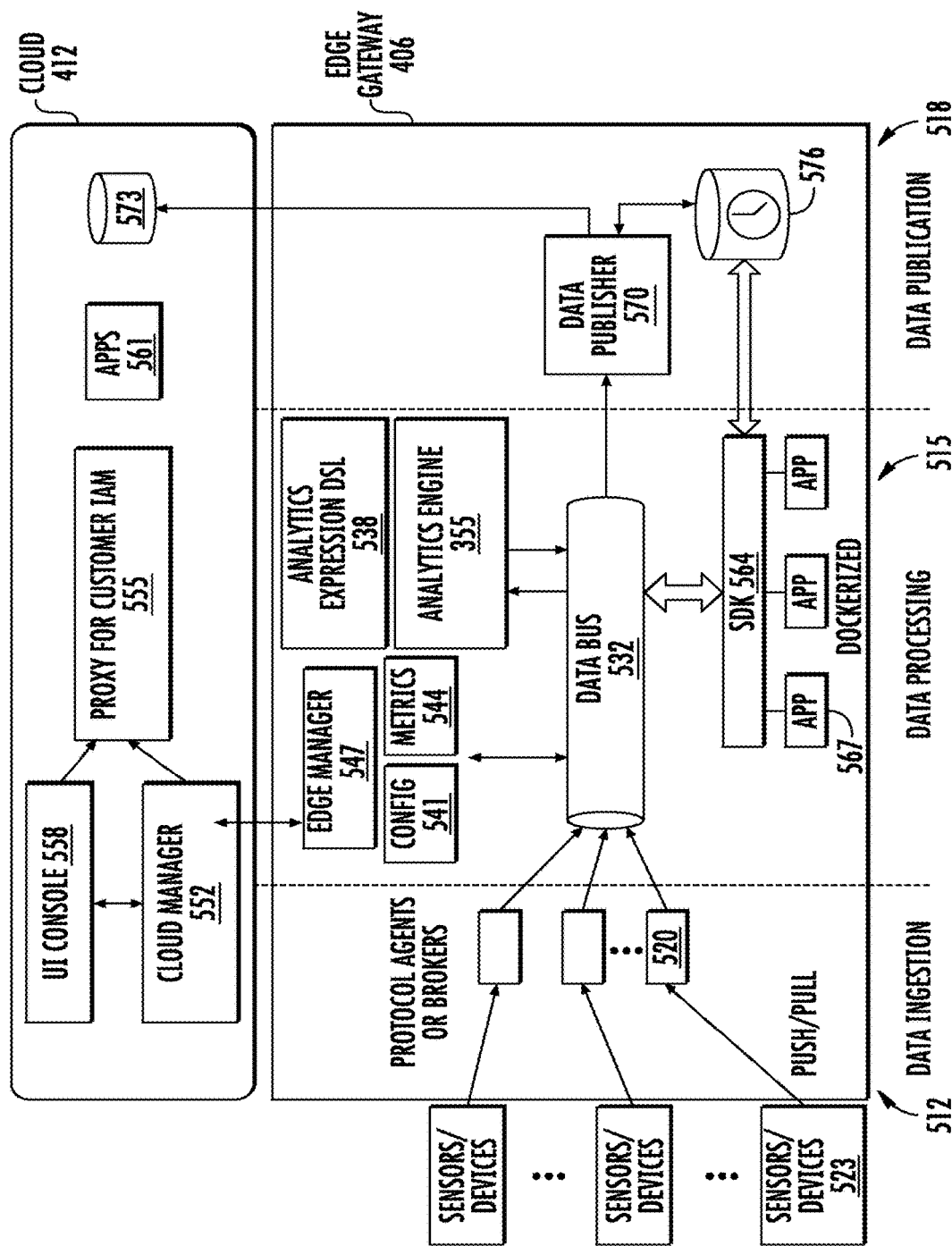
FIG. 5 shows a more detailed block diagram of an edge computing platform including edge analytics.

FIG. 5 shows a more detailed block diagram of an example edge computing platform. The platform comprises three logical layers or sections, data ingestion 512, data processing 515, and data publication 518. The layers function as digital interfaces between the sensors and applications hosted on the edge platform to abstract the heterogeneity in the sensor network. In this representation of an example edge computing platform, a separate data enrichment layer is not illustrated. However, aspects of the data enrichment function as described above are implemented in the data ingestion and data processing logical layers as described below.

The components of the data ingestion layer 512 include protocol agents or brokers 520 that are connected to sensors or devices 523 that generate data, for example sensors and devices in a local network or interconnected local networks, or a combination, in an IoT environment. The data ingestion layer is implemented with a plurality of lightweight, high-availability agents or brokers in such a way that a single point of failure is avoided. The agents collect or ingest data from the sensors over a plurality of network connections via one or more protocols from respective protocol servers. The agents can function as clients or brokers for protocols such as, among others, MQTT, OPC UA, Modbus, and DDS. The agents also ingest audio data in various protocols including MP3, WAV, WMA, and OGG, and video data in various protocols including MP4, MPEG, MPEG4, and MOV. Ingestion of audio and video data may be from live streaming sources or prerecorded files. The data provided or output by the sensors or other network devices, or a combination, is typically a binary data stream. The transmission or delivery of this data from the sensors to the agents can be by push or pull methods.

Push describes a style of communication where the request for a given transaction is initiated by the sender (e.g., sensor). Pull (or get) describes a style of communication where the request for the transmission of information is initiated by the receiver (e.g., agent). Another communication technique that may be used is polling, which the receiver or agent periodically inquires or checks the sensor has data to send.

MQTT (previously MQ Telemetry Transport) is an ISO standard publish-subscribe-based "lightweight" messaging protocol for use on top of the TCP/IP protocol. Alternative protocols that may be used include the Advanced Message Queuing Protocol, the IETF Constrained Application Protocol, XMPP, and Web Application Messaging Protocol (WAMP), as well as those identified above and others known to those skilled in the art.

OPC Unified Architecture (OPC UA) is an industrial M2M communication protocol for interoperability developed by the OPC Foundation. It is the successor to Open Platform Communications (OPC).

Modbus is a serial communications protocol originally published by Modicon (now Schneider Electric) in 1979 for use with its programmable logic controllers (PLCs). Simple and robust, it has since become for all intents and purposes a standard communication protocol. It is now a commonly available means of connecting industrial electronic devices.

When sensors 523 are connected, a connected session occurs between the sensors and corresponding brokers 520. Respective clients may then publish and subscribe to topic names associated with the sensors. For example, various components and applications of the edge platform may subscribe to topic names associated with one or more sensors. The sensors may publish on various topics to components and applications of the edge platform through the brokers 520 over the data bus 532, which is described in further detail below. It will also be understood that various brokers may function as clients with respect to other brokers, and thus topics may be published and subscribed to between brokers.

The brokers 520 are preferably multiprotocol brokers and are optimized to read and ingest massive volumes of data. Internally the brokers are highly performant and use zero-copy buffering for very fast processing. The brokers preferably have built in security to protect and limit access to the edge platform with security credentials. The brokers may access a configuration file containing authorized users' login and password pairs to determine if access is authorized. Also the brokers preferably have built in policies to limit the topics to which authorized users may have access. These access controls are applicable to both built-in and seeded protocol brokers such as MQTT, CoAP, AMQP, or DNP3, and also to custom protocols. The plug-in architecture of the protocol broker makes it very easy to develop brokers for custom protocols.

The data processing layer 515 described further below is implemented as a dynamic computation domain-specific language (DSL)-based directed acyclic graph (DAG) model. This makes the processing of stream data on the edge platform fast, flexible and intuitive. However, since sensor data messages may not arrive at the ingestion layer 512 in timestamp order, it can be difficult in such a model to know when to close the time window for any particular calculation to be made with respect to a data stream. The brokers 520 address this issue and support the DAG model by tracking the low watermark of an application clock for each application subscribing to the data being ingested.

The data ingestion layer 512 also comprises edge mixers. Each sensor posts on its own topic. The time interval at which sensor measures are posted depends on each sensor. Normalization is needed for mixing or combining measures posted by different sensors. Sensor measures are posted to time-based channels. The measures are posted to queues in a circular way. Some or all measures posted by different sensors can be stitched on a time dimension. A sensor mixer performs one or more of the following sensor time series normalization: normalization into an interval; normalization to sum 1; normalization to Euclidean norm 1; normalization to zero mean; normalization to zero mean and unit standard deviation. Edge applications may define the pipeline workflow in the edge mixers via expressions of a sensor expression language such as FogHorn's VEL®.

Before further describing the data processing layer 515, a discussion regarding the communication of data between the layers is in order. The system and method described herein employs a queuing system to account for issues of latency and throughput in communicating data between the layers. The relationship between latency and throughput across different levels or layers is very complicated as defined by Little's law. Each layer may be considered as a separate system including a number of subsystems and it can be assumed that there will be complex dependencies between them. Each subsystem will bind to the rest of the system, either by throughput or by latency. When designing a system, it is useful to consider these interactions and then to create a system that will not bottleneck the larger system. For example, the problem of flow control arises in asynchronous communications between the layers if the sensors send messages at a higher rate than (one of the) receivers can process them.

To address potential backpressure issues that may arise in the present system, which requires asynchronous communication of a high volume of data between the layers, a robust reactive stream processing and queuing mechanism was created. The main driver behind the reactive stream processing approach is to transport the data losslessly across an asynchronous boundary in-memory without requiring unbounded buffers. A continuation-passing style (e.g., actor model) is thus being used. In this approach, when demand from a downstream source reaches zero, a stream actor will simply not pull more from its own upstream source, and since the actor is message-driven it will simply not be scheduled until more demand arrives from the downstream source. No threads are blocked for this and no call stacks preserved, but the actor remembers where it was in the stream. This design facilitates a new way of thinking regarding non-determinism in message processing between levels or layers.

Referring now to the data processing layer 515, the data processing layer is implemented with a directed acyclic graph (DAG), or "stream processing graph" model. A DAG model describes the producer-consumer relationship among processing units associated with multiple streams of sensor data received at the ingestion layer. There are source nodes, sink nodes and processing nodes in the graph, where directed edges represent the information flow between various nodes. The source nodes correspond to the source of the input data streams. These nodes only have edges going out, and do not have any edges between them. The sink nodes correspond to the receivers of the eventual processed information. These nodes only have edges going to them, and do not have any edges in between. Processing nodes stand for processing units. A processing unit may require inputs from multiple data streams simultaneously and may produce one or many valuable output streams. Such a graph can be plotted in a way such that all the directed edges are pointing downward. The system is designed as information coming from the top and passing through the processing units in the middle and eventually leading to the output streams at the bottom.

The data processing 515 components include a data bus 532, which is connected to the agents/brokers 520 of the data ingestion layer 512. The data bus is the central backbone for both data and control messages between all connected components. Various other components of the data processing layer subscribe to data and control messages flowing through the data bus. The analytics engine 535 is one such important component. The analytics engine performs analysis of the sensor data by executing analytic expressions of or developed from an analytics expression domain specific language (DSL) 538, such as FogHorn's VEL®. Other components that connect to the data bus include various edge software stack services described above, including configuration service 541, metrics service 544, edge manager 547, and software development kit (SDK) 564.

The data bus 532 includes a "decoder service" that enriches the incoming data from the sensors and other devices by decoding the raw binary data into consumable data formats (such as JSON) and also by decorating the data with additional necessary and useful metadata, among other things. Further, enrichment can include, but is not limited to, data decoding, metadata decoration, data normalization, and the like.

JSON (sometimes referred to as JavaScript Object Notation) is an open-standard format that uses human-readable text to transmit data objects consisting of attribute-value pairs. JSON is a common data format used for asynchronous browser or server communication (AJAJ) or both. A suitable alternative to JSON is XML, which is used by AJAX. Other suitable alternatives may also be used.

The edge manager 547 connects to cloud 412 and in particular to a cloud manager 552 via any suitable connection mechanism as described above. The cloud manager is connected to a proxy for customer identity and access management (IAM) 555 control, and to a user interface console 558, which are also in the cloud. Identity and access management is the security and business discipline that enables access to various cloud resources to be limited to authorized individuals at authorized times and for authorized reasons. All of the foregoing components are part of the remote edge provisioning or orchestration element generally described above. The cloud assets also may include apps 561 that are accessible by the edge platform via the cloud.

The software development kit (SDK) 564 component connected to the bus facilitates the creation of applications 567 that can be deployed, reside, and execute on the edge gateway platform. The software development kit also is connected to a local time-series database 576 component and can thus access time-series sensor data stored locally on the edge platform or edge gateway to facilitate developing applications intended to reside and execute on the edge platform. Similarly, applications developed using the software development kit 564 can access data in the time-series database 576. As one example, the software development kit can access aggregated time-series sensor data stored locally in the time-series database to facilitate developing and training machine learning models on the edge platform without the need to transmit to a remote cloud facility. This might be the case when there is sufficient compute capability available on the edge platform and the model can be adequately trained or adjusted without requiring a very large data set.

Applications developed using the software development kit can be containerized and thus made mobile so that they can be deployed and executed not only on the edge platform for which they were developed, but also on other edge platform implementations, as well as in the cloud. Container technology virtualizes computer server resources like memory, CPU, and storage that are managed by an operating system (OS) with negligible overhead and without requiring replication of the entire OS kernel for each tenant. It is thus unlike a hypervisor technology. Containers were developed as a part of the popular Linux open-source operating system and have gained significant traction in software development and datacenter operations ("DevOps") with the availability of advanced container creation and management technology like Docker and CoreOS. Docker containers wrap up a piece of software in a complete file system that contains everything the software needs to run: code, runtime, system tools, and system libraries-anything that can be installed on a server. This ensures the software will always run the same, regardless of the environment in which it is running. Thus, by incorporating a container technology such as Docker in the SDK, applications developed using the SDK can be deployed and executed not only on the edge platform for which they were developed, but also on other edge platform implementations, as well as in the cloud. Similarly, applications developed on the edge can be run in the cloud and vice versa, and this is true for essentially all applications, including machine learning applications, and also for expressions, operations, and functions derived from expression languages such as FogHorn's VEL®.

In the example embodiment, containers for applications are created, deployed, and managed intelligently based on factors such as the types of edge environments and devices involved. This intelligence may be implemented in the form of a software apparatus comprising a number of components including centralized administration, deployment topology templates, container mobility management, zero-touch edge deployment, container monitoring, and responsive migration.

The centralized administration component comprises a centralized app or application store such as Industrial App-Store for IoT™. App Store for IoT is a trademark of FogHorn Systems, Inc. All application deployment decisions are controlled and managed centrally in the app store, an example embodiment of which is further described below.

The deployment topology templates component comprises a template for each software application module, which is self-contained with all necessary topological details and execution libraries for deployment on a destination edge infrastructure. This includes composition of needed network protocols, message protocols, and data format parser libraries into a service-chain that the application can use to access data from systems in the sensor network to which the edge platform is connected. The service composition is performed in an intelligent and automated manner using knowledge of the system configurations in the destination edge infrastructure.

The container mobility management component serializes the deployment template objects containing the configured applications and streams them over the Internet or other network connection to reach agents in the software apparatuses at the destination edge infrastructures.

The zero-touch edge deployment component comprises a software apparatus at the edge computing platforms that is capable of interpreting the configured container object received from the app store, and deploying it with the other analytics and data management services implemented in the platform. While there might be some manual effort in the configuration, the deployment process is completely automated with no manual intervention.

The container monitoring component deploys a microservice based architecture in the software platform (apparatus) at the edge that implements a telemetry agent in each container. This agent measures and reports detailed metrics on the performance and availability of the application in the container. The platform is also capable of raising alarms in case any of these metrics behave anomalously.

The responsive migration components comprise methods to trigger migration of containers from the edge platform back to the cloud in response to telemetric agents observing resource contention, service degradation, or other anomalies, or a combination. The responsive migration component frees up resources in the constrained edge infrastructure and may enhance the overall service quality of the applications hosted on the edge. The priority of the applications can also provide a criterion in scheduling such migrations.

The data publication 518 layer includes a data publisher 570 component in addition to time-series database 576. The data publisher component is connected to a remote storage location 573 in the cloud via any suitable connection mechanism as described above, and to the local time-series database 576. The data publisher component is also connected to the data bus and subscribes to data on the bus that is to be stored either in the local time-series database or in the remote cloud storage. The data publisher can transfer raw sensor data as well as ingested and enriched pre-processed sensor data and intelligence information to the local time-series database 576 and to remote cloud storage 573. Further, the data publisher can be used to retrieve aggregated data stored in the local time-series database and to transfer the data to the remote cloud storage, for example to facilitate developing machine learning models for deployment to the edge, as well as evaluating and updating machine learning models already deployed on the edge platform.

The time-series database (TSDB) is a software system that is optimized for handling time series data comprising arrays of numbers indexed by time (e.g., a date-time or a date-time range). The time-series database typically comprises a rolling or circular buffer or queue, in which as new information is added to the database, the oldest information is removed. This arrangement is beneficial for use in an edge platform environment because it makes efficient use of the limited storage capacity typically available in such an environment.

Figure 6:
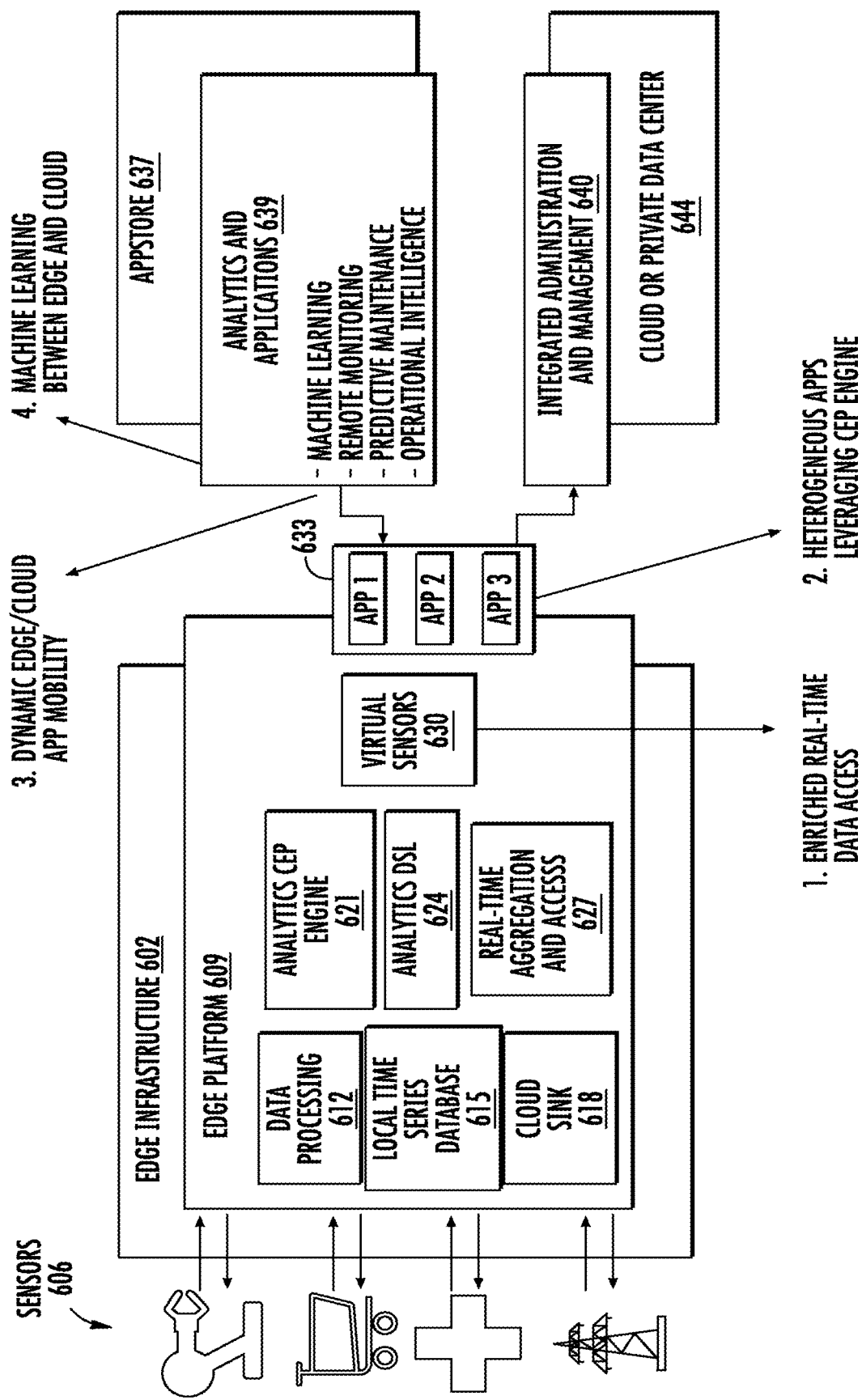
FIG. 6 shows an operational flow between edge infrastructure and cloud infrastructure.

FIG. 6 shows an example operational flow between an example edge infrastructure 602 and example cloud infrastructure, such as cloud 412 of FIGS. 4 and 5. Some specific aspects of an example edge infrastructure and an example cloud infrastructure have been described above for reference.

Data is gathered at the edge from sensors 606 or other devices, or a combination. The sensors and devices can be distributed in one or more local networks in an IoT environment and the edge infrastructure can be connected to the networks between the sensors and the cloud. For example, the sensors could be distributed in one or more local networks in connection with industrial, retail, health care, medical devices, power, or communication applications, or any combination of these, or others.

The edge infrastructure 602 resides physically and logically between the sensors and the cloud or other remote networks or facilities. The edge infrastructure comprises certain hardware components, such as network connections and a processor, and also a software edge platform 609, which comprises various of the components and elements described above with respect to FIGS. 4 and 5. Thus, in this example the software edge platform comprises a data processing component 612, local time-series database 615, cloud sink 618, analytics complex event processing engine (CEP) 621, analytics real-time streaming domain-specific language (DSL) 624 (e.g., the VEL® language by Foghorn), and real-time aggregation and access 627 components. The platform also can include virtual sensors 630, which are described below in more detail. The virtual sensors can be employed to provide access to enriched real-time data and intelligence information derived therefrom.

The features and functionality of the edge platform are accessible via one or more applications 633, such as applications or "apps" 1, 2, and 3. As previously described, the apps can be developed using the software development kit or SDK 564. Applications developed using the SDK can be heterogeneous (e.g., developed in multiple different languages) and can nevertheless be deployed on the edge or in the cloud, thereby providing dynamic application mobility between the edge and cloud. In other words, the apps can be used as part of the edge, as part of the cloud, or both. The dynamic app mobility feature is made possible due to the apps being containerized, as described above, so that they can operate independently of the particular compute platform on which they are executed. The same dynamic mobility feature also can be applied to analytics expressions and functions integral to or derived from, or both, the analytics DSL 624, e.g., FogHorn's VEL®, as well as to machine learning models, so that they also can reside and execute on either the edge platform or the cloud.

The applications leverage the complex event processing engine 621. For example, an application can trigger or invoke the CEP engine to execute one or more specified analytics expressions or functions with respect to sensor data and generate an output which the application may then use. Similarly, an application can be triggered into performing some action by an output of the CEP engine generated in response to detecting a pattern in sensor data.

The number of different applications that can be developed are as extensive and as varied as the potential technical and industrial applications that can be conceived. For example, a wide variety of data analytics and applications 639 can be developed to perform a wide variety of functions including machine learning, remote monitoring, predictive maintenance, operational intelligence, as well as combinations of these and many others. In addition, many types of administrative and management type applications are possible. For example, applications that allow for integrated administration and management 640 of individual or distributed edge platforms and for monitoring and storing edge data in the cloud or at a private data center 644 can be developed and deployed to the edge platform.

The applications can be distributed and deployed using an app store 637 as described above. Through the app store, users, developers, and others can upload, download, and share apps with others. The app store may be provided by an edge platform developer, customer, or partner, for example. The app store also can function as a commercial marketplace for applications. The app store may be implemented as a software platform and preferably addresses the unique reliability, security, deployment, and data-management needs presented in IoT environments and use-cases. The app store may be hosted in the cloud by the edge developer, at other cloud or remote network locations by independent developers, or in the local network or another network, or a combination, connected thereto by a customer or partner of the edge developer, for example.

The app store preferably comprises an application manifest associated with each application in the store. It is desirable to provide an application manifest associated with each application because IoT environments and applications, and particularly Industrial IoT environments and applications, have deep and varied deployment contexts. Deployment context information can be captured as metadata and stored with an application. The context information may include such information as edge hardware specifications, deployment location, information about compatible systems, data-access control information, e.g., password control, for security and privacy, emulators for modeling data fields unavailable in a given deployment, and version management. For example, as previously described, the edge infrastructure comprises certain hardware as a physical layer between physical sensors and one or more external communication channels. The edge computing platform also can be used to define virtual or software programmable sensors as described below. The edge computing platform may be implemented in software, hardware, firmware, embedded hardware, standalone hardware, application specific-hardware, or any combination of these. The manifest associated with a given application preferably will provide identifying information and specifications related to these and perhaps other implementation characteristics, features, and requirements with respect to which the application is designed to function or which the application requires to function.

Based on a request from an edge platform to deploy or download an application, the app store is configured to match the right manifest with the deployment scenario of the edge platform based on the parameters listed above. The app store platform also preferably performs operational tasks specific to edge deployment scenarios including data consistency, application state hand-off, and security credentials management. These are essential stages of the migration process for applications moving from the cloud or data center location to the edge as application-container objects.

As mentioned above, many different edge applications are possible, including apps that provide integrated administration and management 640 of one or more edge platforms, which may include monitoring or storing of data in the cloud or at a private data center 644. In addition, applications of the edge infrastructure can provide such important functionalities as real-time feedback and automated systems control to some of the toughest and most remote industrial environments. A number of specific applications are described in FogHorn's U.S. Pat. No. 10,007,513 at col. 13, line 55 to col. 15, line 13.

Still referring to FIG. 6, sensors 606 comprise a plurality of physical sensors, for example distributed in a local network of an IoT environment. Each sensor comprises an electronic transducer, which measures or captures some characteristic of its environment as an analog or digital measurement or value. Analog measurements are typically converted to digital quantities using analog to digital converters (ADC's). Sensor data may be measured based on need (polled), or may be available as a continuous stream of data at a uniform rate or asynchronously. Typical sensor specifications are range, accuracy, resolution, drift, stability, and other attributes. Most measurement systems and applications utilize or communicate sensor data directly for processing, transportation, or storage.

The virtual sensors 630 of the example edge software platform 609 are also referred to as "programmable software-defined sensors." These are software-based sensors created from an analytics expression language, such as FogHorn's VEL® analytics expression language. The VEL® language is implemented efficiently to support real-time streaming analytics in a constrained low footprint environment with low latencies of execution. For example, a latency of the system can be about 10 milliseconds or less.

In an example implementation, a programmable software-defined sensor may be created using a declarative application program interface (API) called a "sensor expression language" or SXL. FogHorn's VEL® is a specific implementation of an SXL language. In this application, SXL and VEL® are used interchangeably. The SXL-sensor created through this construct can then provide derived measurements from data generated by multiple sources including physical sensors and other SXL-sensors. This derived intelligence information can then be used by applications to provide insights, control actions, or for other purposes.

An SXL (e.g., VEL®) sensor can be derived from any one or a combination of three sources: a single physical sensor, multiple physical sensors, and a combination of virtual and physical sensors. For example, a virtual or SXL sensor may be derived from a single physical sensor by transforming the incoming physical sensor data using dynamic calibration, signal processing, math expression, data compaction or data analytics, or any combination of these by executing the appropriate corresponding analytics expressions or functions, or both. As another example, a virtual or SXL sensor may be derived as a combination or transformation (using the methods described above), or both, of incoming physical sensor data from multiple heterogeneous physical sensors. As yet another example, a virtual or SXL sensor may be derived by combining or transforming, or both, physical sensor data from one or more physical sensors and virtual sensor data from one or more other virtual or SXL sensors.

SXL (e.g., VEL®) sensors typically will be domain-specific and will be created with a specific application in mind. A specific implementation of an SXL programming interface enables edge applications to define data analytics through various transformations (e.g., math expressions) and aggregations of input data. For example, FogHorn's VEL® includes a set of mathematical operators within its programming language that can be used for these purposes. The VEL® operators also are supported by Java and the VEL® programming interface is well integrated with typical physical sensors and their protocols.

The virtual sensors typically operate at runtime by executing SXL constructs, expressions, or programs on input data. In the example intelligent edge platform, the data input to the virtual sensors will typically include streaming data generated by physical sensors or other devices and the virtual sensors will operate on the data in real-time and produce analytics outputs substantially in real-time. However, the virtual sensors also may operate on outputs of other virtual sensors and on input data that was previously aggregated and stored, for example in the time-series database. The latter can be useful in creating and training machine learning models on the edge computing platform without the need to transmit to a remote network. It is also important to note that the data generated by virtual SXL-sensors can be stored in the time-series database on the edge platform or can be sent to local storage in the local enterprise network. It also may be communicated to or within edge or other applications, or may be transferred, or a combination, to other remote services (e.g., cloud) for further analysis. Thus, the virtual sensors can either output data as a local stream or publish the output data as first class data streams on the data bus of the edge platform.

The SXL sensors are designed as software apparatuses to operate on input data and to produce analytics outputs in real-time at suitable rates for use by edge applications. To achieve a suitable rate of real-time execution, the SXL expressions comprising the sensors should be executed in a highly-efficient execution engine, such as the CEP, preferably in local compute hardware, for example embedded compute hardware.

As will be appreciated, the provision and use of virtual SXL sensors as part of the example intelligent edge platform bring a number of benefits. They are programmable and therefore able to flexibly synthesize data to match specific application requirements related to data quality, frequency, and information. They can also be conveniently and widely distributed as "over-the-air" software upgrades to plug into data sourced from physical sensors and other (e.g., preexisting) SXL sensors. This allows application developers to create a digital infrastructure conducive to the efficient execution of business logic independent of the layout of the physical infrastructure. They can be used to create a digital layer of abstraction between applications and physical sensors, which insulates developers from changes in the physical infrastructure due to upgrades and services to the physical sensors. They also can create efficiencies in information management by transforming high volumes of raw data from physical sensors into a precise representation of the more limited information, e.g., analytical insights, that is useful or of interest. This efficiency translates into more efficient utilization of the IT resources that are likely to be significantly constrained at the edge, like compute, networking, and storage resources. Further, because they produce in real-time data and information computed from real-world or physical sensor data streams, they make the data available for use by edge applications with minimum time delays, i.e., substantially in real-time.

Examples of virtual sensors for deriving pressure differential and vapor pressure data from flow, pressure, and temperature data generated by physical sensors of a pump using a declarative SXL API generally and FogHorn's VEL® language more specifically are shown and described with respect to Tables A and B respectively of FogHorn's U.S. Pat. No. 10,007,513. In addition, the VEL® example demonstrates how the analytical information derived by the virtual sensors can be used to generate a pump cavitation alert. These examples and their corresponding explanations are incorporated here by reference.

Figure 7:
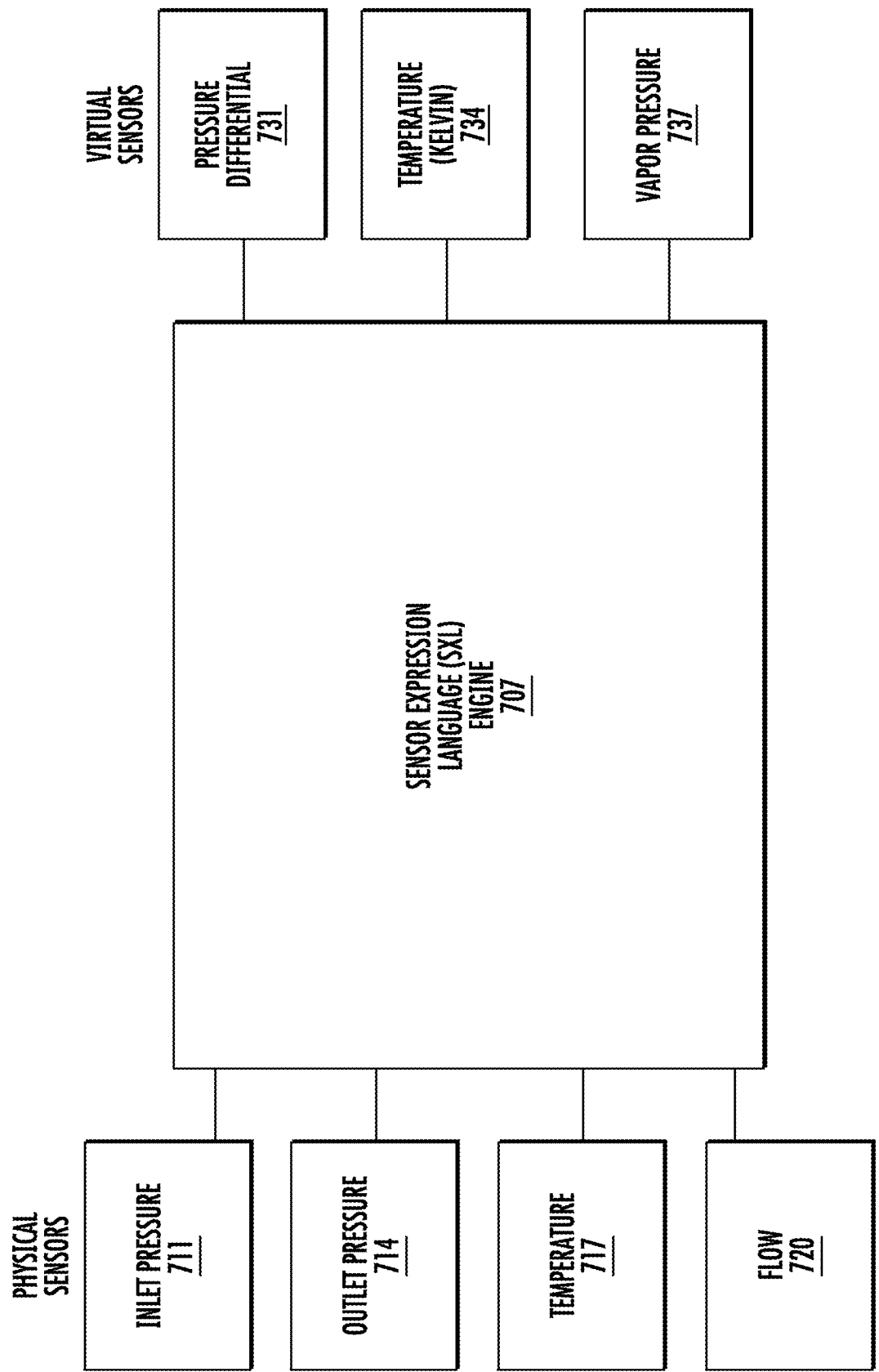
FIG. 7 shows an example of using physical sensors to create, via a sensor expression language engine, some virtual sensors.

FIG. 7 shows sensor expression language engine 707 that is used to create virtual sensors from inputs. The sensor expression language engine takes input from physical sensors or other virtual sensors. Some examples of inputs include inlet pressure 711, outlet pressure 714, temperature 717, and flow 720. Any number of inputs or combination of inputs can be used as input to a virtual sensor. Based on the input, the sensor expression language engine can generate one or more virtual sensors with one or more outputs, such as pressure differential 731, temperature 734 (which may be in Kelvin), and vapor pressure 737. It will be appreciated that although FIG. 7 shows multiple boxes (e.g., 731, 734, and 737) each representing a virtual sensor with a single output, a virtual sensor can have multiple outputs. For example, virtual sensors 731 and 734 could be combined into a single virtual sensor having two outputs, or virtual sensors 731, 734, and 737 could be combined into a single virtual sensor having three outputs. Indeed, any number of virtual sensors can be defined and each virtual sensor can be defined to have any number of inputs and outputs. As described, each output of a virtual sensor can be a mathematical function of one or more inputs to the virtual sensor, an aggregation or other combination of inputs, a logical function of inputs, a combination of these, and others.

In general, in an example method of operation of an example intelligent edge computing platform as described above, application developers express the data semantics used by their application software to the edge platform and expose their repository of applications to it. One or more applications are deployed to the edge platform depending on the operations desired to be performed and the functions desired to be accomplished at the edge. The one or more deployed applications are executed on the edge platform and have access to one or more ingested and enriched data streams generated by one or more physical sensors in the connected local network or networks and one or more virtual sensor data streams from one or more virtual sensors executing on the edge platform. The applications operate on the data streams in real-time, which may include executing analytics expressions and functions thereon and identifying patterns and semantics in the data signifying events, occurrences, conditions, or the like related to operations, devices, machine and the like in the local network. The applications also may analyze the data streams in real-time, which may include executing analytics expressions and functions thereon, and may generate intelligence information or other analytics information, or a combination, or results.

The applications may make determinations and may cause the sensor data streams or portions thereof to be stored locally at the edge, transferred to a remote cloud for storage or processing, or both, or analysis, or any combination. The applications may make determinations and cause the intelligence information or other analytics information, or a combination, to be stored locally or transferred to the remote cloud. The applications may trigger actions to be taken in the connected local network based on the sensor data, intelligence information, or other analytics data, or a combination.

It will be appreciated that based on various semantics discovered in the sensor data, edge applications may intelligently customize a composition of services and analytics to be executed, which may include communicating with or invoking, or both, the execution of other applications for various purposes, including other applications on the edge, in the cloud, or on other computing platforms, or any combination, in a local enterprise network. Cooperating applications may execute at both the cloud and edge platform and may use software services on the edge platform to manage inter-application communications.

From a software perspective, the sensor stream data generated in the local network may trigger a software layer hosted on either an edge gateway platform or device, or an embedded system. The software layer is connected to the local-area sensor network. The software layer makes available on the edge computing platform or in the cloud a repository, or a combination, of services, applications, and data processing engines. The software layer executes analytics expressions on the sensor stream data and matches the sensor data with semantic descriptions of occurrence of specific conditions through an expression language made available by the software layer. The software layer automatically discovers pattern events in the stream data in real-time by continuously executing the expressions. Based on the semantics matched, the software layer may intelligently compose services and applications across the edge gateway device and embedded systems across the network managed by the software layer for chaining applications and analytics expressions to be executed. The layout of the applications and analytics may be organized based on resource availability. The health of the software layer may be monitored remotely. The software layer or applications or services invoked thereby may cause raw sensor data or enriched data or intelligence information resulting from the execution of analytics expressions on the data to be stored in the local time-series database or remotely in cloud storage. The services, applications, expressions, functions, and other software components can be containerized to ensure smooth running in any gateway environment.

In another exemplary general method, invocation of a service is triggered by sensor data received in a software apparatus hosted on an edge gateway platform or device, or an embedded system or device connected to a wide-area network, where a repository of services, applications and data-processing engines are accessible by the software apparatus. The software apparatus matches sensor data with semantic descriptions of data made available by the software apparatus by executing analytic expressions of an expression language on the data. Upon determining a match, the software apparatus discovers all applications designed for the pattern of semantic types of data matched, intelligently composes services across the edge gateway device and servers distributed across the wide-area network managed by the software apparatus for chaining all applications and analytics matched, and optimizes the layout of the applications and analytics based on resource availability at the edge gateway device.

The example method by which the software apparatus composes a service chain intelligently by leveraging dynamic context from sensor data and applications in the repository solves many problems related to the diverse heterogeneity of sensors, data, protocols, network environments, and compute environments; the so-called last-mile gap resulting from high volumes of sensor data to be processed and analyzed and the remoteness of cloud-based services; and the security and data silo challenges of IoT software having to be re-engineered, reconfigured and redeployed for numerous different platforms, sensors, devices, networks, and computing environments.

In somewhat more detail, one or more sensor data streams reach the software apparatus through multiple network interfaces of the edge gateway platform or device. The software apparatus examines the message headers in each data stream for patterns indicating known data protocols supported. Upon discovery of a pattern of a supported protocol, the software apparatus loads the relevant protocol broker service and ingests the data stream in the first stage of the composition.

The software apparatus discovers dimensions of data semantics in the data streaming through the protocol broker, matches patterns in the semantics expressed by application developers, and creates a scored list of matched elements. All matching scans are secured by a token-exchange protocol to ensure developers have access to the data being matched. The apparatus can load the data semantics with the highest match score, or recommend the same through a human machine interface for manual confirmation. The service composition adds the developer data semantics.

The software apparatus then mixes the sensor stream data from different physical sources as necessary to match the discovered application's definition of data semantics.

The discovered application's analytics service dependencies are analyzed and provisioned by the software apparatus on the edge gateway platform or device near the sensors, as well as other servers in datacenters under the management of the same apparatus.

The data streaming with the appropriate semantics are channeled through data processing pipelines by the software apparatus to transform the data as needed by the discovered application.

The software apparatus manages the transfer of data across wide-area networks over secured links for consistency between analytic processing pipelines spread geographically.

The discovered application can securely access the transformed data through programmatic API's (with token-exchange based security) previously disclosed to the developers, for example in the software apparatus' manuals. The discovered applications are chained to the service composition at the appropriate venue (edge gateway platform or device, datacenter server) based on the quality of service needed and availability of resources at that instance.

Machine Learning Capability on the Edge Computing Platform

The description will now turn more specifically to the machine learning aspects of the example software edge platform. Among the numerous applications that can be developed for, deployed to, and executed on the example edge computing platform, applications employing machine learning are particularly powerful. Machine learning has evolved as a key computation construct in automating discovery of patterns in data and using the models built to produce intelligent predictions or inferences in a variety of industrial verticals. Applications of machine learning to sensor data are relevant for data-driven business and operational planning use-cases in the overall Internet of Things (IoT) market segments.

However, the application of machine learning to sensor data at the edge poses various scalability and efficiency challenges, among others. Control systems and machines deployed in physical operations typically generate very large volumes of continuously streaming data. However, typical machine learning (ML) models are developed for use on batched or micro-batched static data and do not work well with the high-velocity, high-volume streaming data from sensors, and others to be processed and analyzed locally at the edge computing platform. In addition, cost and logistics limit the ability to aggregate such data at the edge for machine learning analysis.

Sensor and other data generated in industrial systems operations typically have very little structure and metadata associated therewith and data corruptions and missing values are rampant. Further, the features constituting the generated data vary widely between different instances of similar operational systems. This severely reduces the fidelity of the results that ML models developed through traditional machine learning analyses are able to produce from such data.

Related to that, ML models typically are developed with necessary, expensive, and resource demanding pre-processing (data alignment, conditioning, filtering, and others) and post-processing (aggregation, alert generation, and others) logic incorporated as integral parts of the models themselves. Moreover, typical ML models are developed with an assumption that essentially unlimited compute power will be available and thus few or no constraints are typically placed on model size and weights. However, as described herein, edge computing platforms typically are resource constrained, especially in terms of compute power, local storage, and others, which makes it difficult or impossible to successfully incorporate typical ML models at the edge.

More often than not performing the pre-processing of input data correctly and efficiently is really at the heart of the correctness of an ML model's prediction. ML models are really fragile if the data used in training doesn't align closely with the data used in production—therefore, the importance of the pre-processing step such that ML models are useful in the field for real business context.

In most practical scenarios, approximately 50% of an ML model's code is directed to the data pre-processing functions. Typically in the cloud this is done via a complex data processing pipeline in a macro batch style where the output of each stage sometimes goes to in-memory storage or a database or filesystem and then is picked up by the next stage. This places a heavy processing burden on the runtime infrastructure footprint both in terms of storage and disk. Although this burden may not be a concern in a cloud environment with substantial compute and storage assets available, the constraints on the edge (storage & CPU) just don't allow for such cloud like infrastructure runtimes to support ML model scoring/inference/execution.

As referred to above, apart from infrastructure runtime constraints on the edge, one of the other biggest challenges to applying ML models at the edge (especially for industrial and commercial IoT solutions) is the inherent semantic difference between handling ML inferences (predictions) in a streaming context versus executing the models against recorded historical data. A concrete example of this can be illustrated in the context of running predictive maintenance analytics for elevators at the edge of an IoT network. In this context, the memory and storage assets on the edge platform are constrained and sensors are continuously streaming data to the edge platform at approximately 5 ms intervals. Typically in a cloud environment an algorithm would be developed and executed that collects the sensor data for a few minutes and runs the number crunching and ML inferencing on the collected static data. However, in this approach the live state of the elevator in real-time would be unknown. In other words, all of the inferences and insights provided by the cloud-based ML model would be post-hoc or hindsight. In addition, as shown and described below with respect to FIG. 11, data values that could be critical to producing an accurate prediction could be lost in the process of uploading data from the edge to the cloud.

In addition, due to the memory and storage constraints, such an ML model would not even be able to run on the edge. In contrast, an "edge-ified" ML model as described herein is able to operate on the edge with constrained resources and in real-time on streaming sensor data indicating present elevator conditions, is able to predict essentially in real-time an imminent failure, and thus is able to immediately trigger a warning or remedial action.

While it may be possible to achieve higher fidelity of prediction (ML inference) in the cloud than at the edge, the increased fidelity is achieved at an aggregate level. In contrast, the prediction (ML inference) required at the edge is typically at a much more granular level. As per the above example, it is desired to predict and examine elevator states just as they are happening based on all of the data values generated by the sensors, instead of examining the past. Thus one of the biggest gaps in iterative cloud-edge closed loop machine learning is translating the ML models for execution in a real-time streaming data environment while still preserving the exact semantics of the ML model needed for execution in the cloud environment.

The example edge platform with machine learning capability and associated method described herein overcome the foregoing deficiencies associated with typical cloud-based machine learning models. They implement machine learning models that are converted and optimized to execute efficiently at the edge in real-time on streaming sensor data and provide immediate and accurate predictions and insights that are highly useful in IoT, and especially IIoT, environments. The edge-based machine learning models seamlessly connect to the streaming sensor data received at the edge platform. Pre-processing and enrichment (cleansed, filtered, normalized and contextualized) of the raw sensor data is accomplished in real-time by executing selected expressions derived from FogHorn's VEL® expression language in the complex event processor (CEP) prior to the models being applied to the data. Pre-processing of the sensor data under programmatic control enables it to be presented directly to various models in exactly the form specified for each model. Post-processing of model outputs is similarly accomplished via the execution of appropriate VEL® expressions in the CEP. Because the models are relieved of the substantial processing burden associated with pre- and post-processing, they are able to execute rapidly, efficiently and with limited edge computing capabilities.

In addition, the models themselves are converted and optimized to execute efficiently and rapidly on the edge platform on the streaming sensor data in real-time. This may include optimizing the model computations and entirely or partially converting the models from typical high-level cloud-based machine learning model languages (e.g., Python) or specifications (e.g., PMML, PFA, ONNX, and others) to scripts of expressions of an analytics expression language, such as VEL®, which are specifically adapted to execute efficiently in the CEP. The converted and optimized models are thus able to execute very rapidly in real-time on the streaming sensor data received at the edge platform and to provide immediate outputs at rates sufficient for edge-based machine learning applications to trigger immediate actions. Model creation and training may still be accomplished in the cloud, where significant compute and storage resources are available. Once a model is trained, it can then be "edge-ified" as described herein and pushed to the edge for live execution. Ultimately inferences produced by models at the edge can be frequently sent to the cloud to further tune the models, and the updated models pushed back to the edge in a highly iterative, closed-loop fashion. In that regard, "AI" in IIOT can really be thought of as this closed-loop edge to cloud machine learning and model "edge-ification."

In general, the example software edge platform described herein is designed to be capable to perform machine-learning workflows that span the local compute resources available at the edges of sensor networks and the resources available in remote data centers or "cloud" sites. The software edge platform processes continuous streams of raw sensor data and aggregates the processed data at the edge. The processing is performed under programmatic control through API's by the developers of machine learning analyses to preprocess the data as specified for use in the machine learning analyses. Machine learning models are constructed from the machine learning analyses and can then be deployed to the edge platform for execution on live sensor data.

The software edge platform is capable to provide querying and pre-processing of sensor data on which machine learning models constructed according to the machine learning workflow described above may execute, and to emit the results of the model execution to the cloud for model valuation.

The software edge platform also is capable to provide sensor data segmentation at the edge by partitioning raw sensor data based on constituent feature sets in the data, and to intelligently match the partitioned data with corresponding machine models constructed according to the above-described machine learning workflow.

The software edge platform also is capable to provide real-time model training and selection at the edge based on the above-described workflow of pre-processing sensor data, query-based model execution on pre-processed sensor data, and feature based data segmentation and intelligent matching.

The foregoing capabilities of the software edge platform together can effectively constitute a system construct of machine learning as a service.

The software edge platform also can coordinate model execution and communication on an instance of the edge platform and across multiple instances of edge infrastructure that can be spread across a wide geographic area. The models can be executed on sensor data across segments of different feature spaces. The edge platform can transfer the knowledge learned across the different feature spaces by using the cloud as a platform for transferred learning. This brings a lot of efficiency to the machine learning process by avoiding data-labeling and by leveraging data with heterogeneous labels.

The example edge computing platform with machine learning capability will find use in a variety of industrial and other applications or use-cases. A number of example use-cases are identified and described in FogHorn's U.S. Pat. No. 10,007,513 (e.g., see column 25, line 60 to column 27, line 29), which is incorporated by reference along with all other reference cited in this application.

Figure 8:
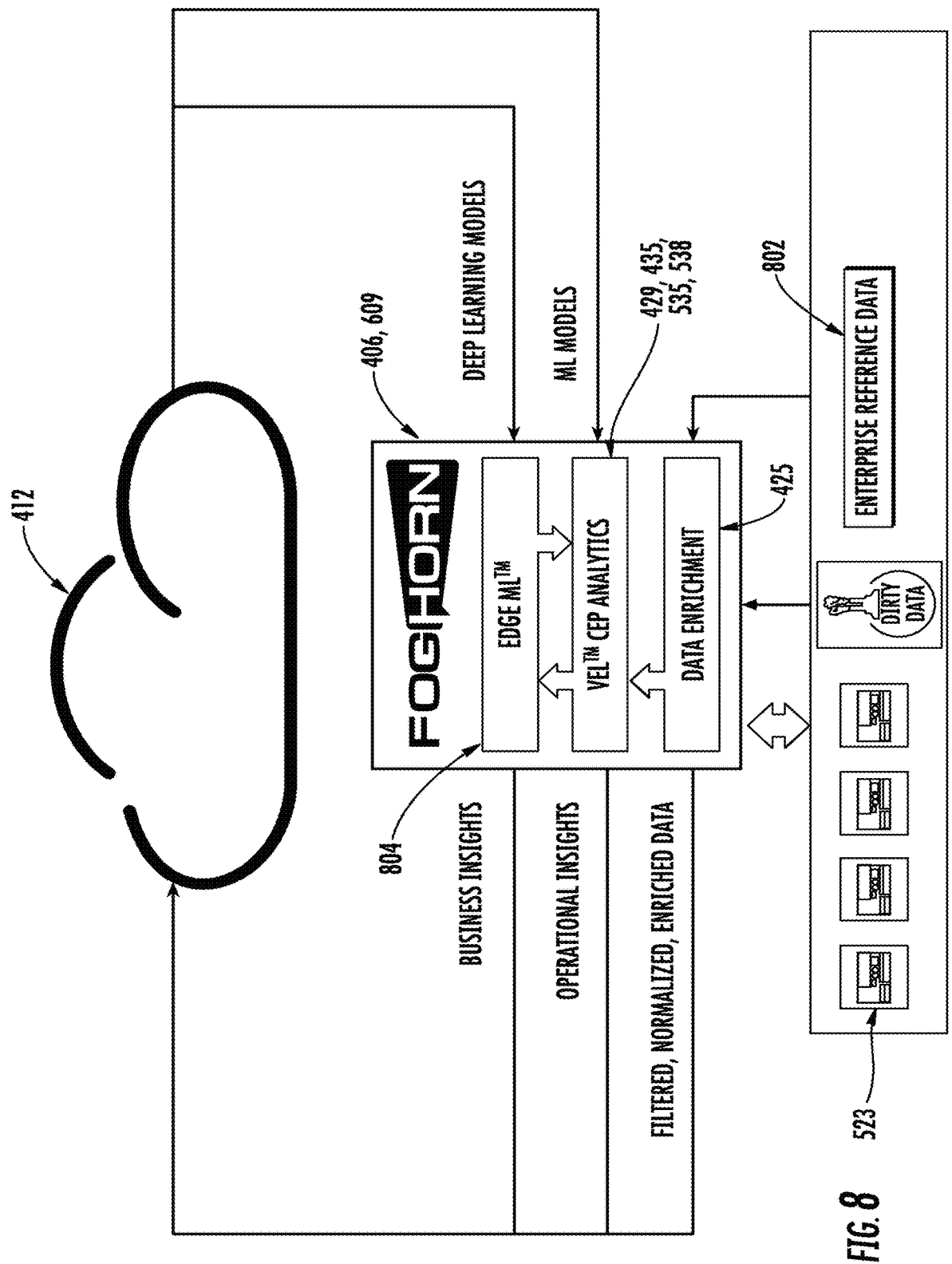
FIG. 8 shows a general functional block diagram illustrating an example intelligent edge computing platform with machine learning capability in a closed-loop machine learning environment.
Figure 9:
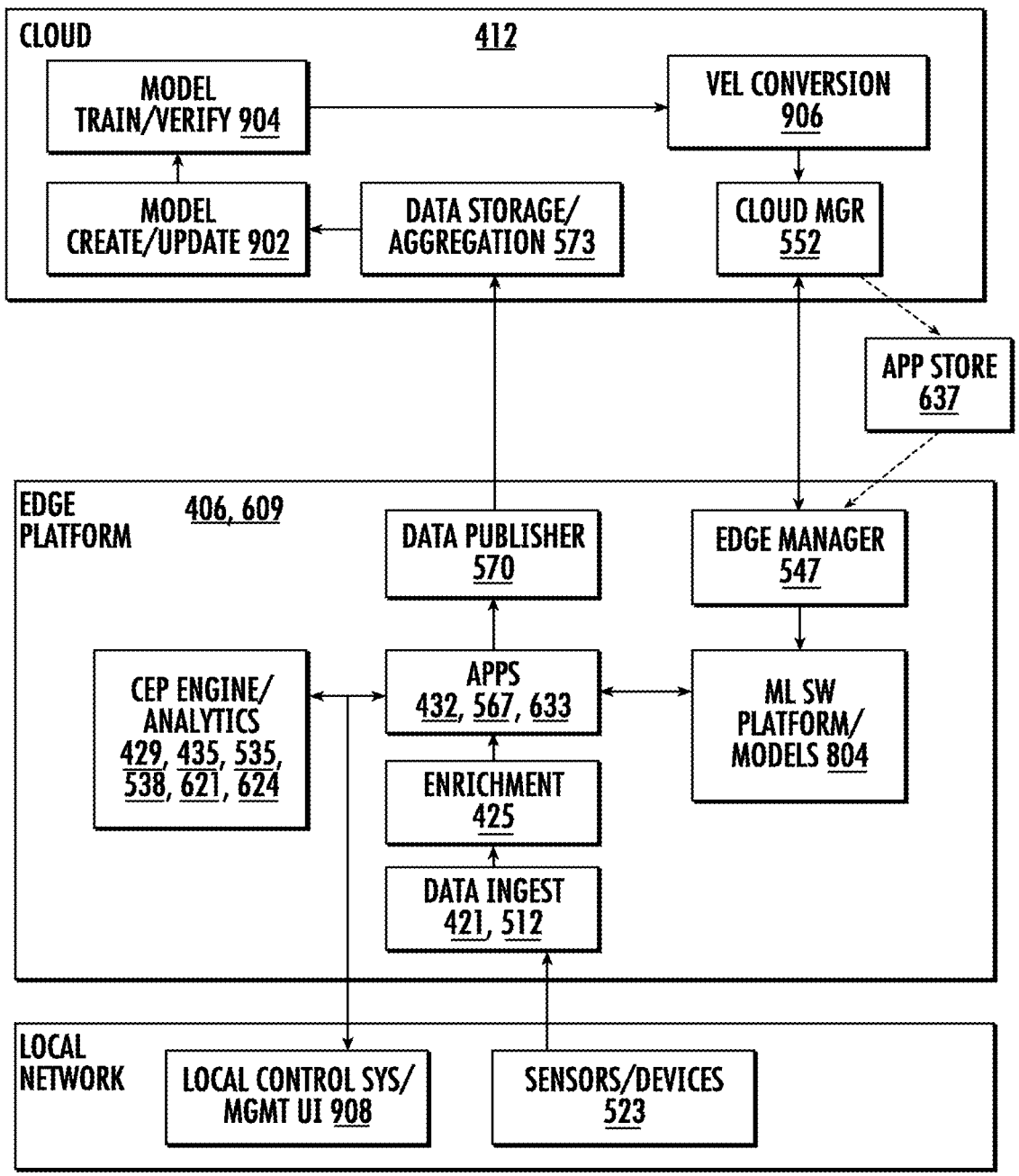
FIG. 9 shows a more detailed functional block diagram illustrating an example intelligent edge computing platform with machine learning capability in a closed-loop machine learning environment.

FIG. 8 is a general functional block diagram and FIG. 9 is a more detailed functional block diagram illustrating an example intelligent edge computing platform with machine learning capability 406, 609 and associated method. As previously described, the edge platform 406, 609 comprises data ingestion 421, 512 and enrichment 425 components. These components receive streams of raw or "dirty" data from sensors and devices 523 in the local network, ingest them onto the edge platform and enrich them in preparation to be operated on by an edge-based ML model.

The enrichment may include, for example, decoding or normalizing the data, or both, such as in one of the manners previously identified herein. It also may include identifying missing data measurements or points and substituting data in any number of ways, for example by interpolation from adjacent data points or averaging. It may also include identifying data elements that are either out of an expected range or are otherwise outliers and take corrective action. It may include correcting or recovering data, or both, that has become corrupted. It also may include the addition of or "decorating" with certain metadata, and other cleansing, filtering, or contextualization, or any combination. It may also include aligning or aggregating, or both, data received from multiple sources. With respect to audio and video data, it may also include image resizing, color conversion, up and down sampling, and others. In essence, it may include anything necessary to convert raw sensor data to a form that is more accurate and usable by a machine learning model to produce accurate inferences.

It should be understood that while enrichment of the received data may be thought of as a type of data pre-processing prior to model operation, it differs in important respects from the type of pre-processing often included in cloud-based ML models and described further below in connection with the edge-conversion of such models. In that context, pre-processing relates to the manipulation and processing of perhaps multiple already enriched data streams to generate specific data input streams as specified by a particular model. Such preprocessing may include, for example, contextualizing, aligning, running statistical or math functions, or both, filtering, smoothing, grouping, or aggregating data, or any combination, from the streams, or otherwise forming from the streams the specific data input streams specified by the model.

As referred to above, the data ingestion and enrichment of the raw sensor data streams is preferably carried out under programmatic control via API's and it will be appreciated that the pre-processing of the enriched data streams may be and preferably is carried out similarly. It will also be appreciated that any post-processing of model outputs, for example aggregation or generation of alerts, can be and preferably is handled similarly.

More specifically, the data ingestion and enrichment, as well as any pre-processing and post-processing, may be carried out on the edge platform by executing scripts of expressions of an expression language 435, 538, 624, preferably FogHorn's \TEL®, in the CEP engine 429, 535, 621. The ingestion, enrichment, pre-processing, and post-processing are performed in real-time as the streams are received at the platform. Accordingly, the example edge platform allows and supports machine learning models especially suited for execution at the edge that do not require and preferably do not incorporate the large, expensive and compute resource heavy pre-processing and post-processing otherwise often incorporated in cloud-based models.

As referred to previously, the example edge platform with machine learning capability comprises data analytics 435 (FIG. 4), 538 (FIG. 5), 624 (FIG. 6) and CEP engine 429 (FIG. 4), 535 (FIG. 5), 621 (FIG. 6) components which respectively incorporate analytics expressions and functions defined using an analytics expression language 538, such as FogHorn's VEL®, and an analytics engine for executing such expressions and functions. As previously described, the detection of patterns in the sensor data matching certain characteristics or features, i.e., semantics, e.g., topics, fields, data type and value pairs, and others, during the ingestion and enrichment processes can trigger execution by the CEP of corresponding analytics expressions or functions, or a combination, on the data to produce various analytics results. Applications 432 (FIG. 4), 567 (FIG. 5), 633 (FIG. 6) and ML models on the edge platform also can be triggered to execute by the CEP based on such detection and can access the results of CEP execution of expressions and functions. The applications and models also can invoke the CEP 432 to execute analytics expressions of the analytics component 435 as necessary for the applications or models, or a combination.

The example edge platform with machine learning capability also comprises a machine learning software platform 804. A particular implementation of the machine learning platform is Edge ML™ by FogHorn. The machine learning software platform 804 preferably comprises a plurality of standard ML models that may be selected and executed on the edge platform. It also preferably incorporates functionality for importing additional custom or proprietary models, and for exporting models, for example for deployment on other edge installations.

Although the machine learning platform 804 is illustrated as part of the edge platform 406, 609, it will be appreciated that the platform can reside and execute on the same computing platform as the edge platform or on another computing platform, for example in the cloud or in a local enterprise network, and communicate with the edge platform over the Internet or other local or remote network connection. The models on the machine learning software platform can be manually selected for incorporation in workflows on the edge platform and can be invoked by applications executing on the edge platform.

While various standard ML models may be incorporated as part of the machine learning platform 804, it will be appreciated that the total number of different models that may be accommodated on a particular instance of an edge platform may be limited by storage constraints. It should also be appreciated some models may not be particularly suitable for use at the edge due to their complexity, the limited edge compute resources available, and the desire that the models be capable of analyzing continuous stream data and producing predictions or inferences based thereon substantially in real-time. In the presently preferred example embodiment, the standard models include at least classification models (decision tree classification, logistic regression classification, Gaussian and multinomial Naive Bayes classification, nearest neighbor (KNN) classification, neural network classification (CNN, RNN), and support vector machines classification), regression models (decision tree regression, generalized linear models including ARIMA, linear, lasso, elastic net, and ridge regression), nearest neighbor (KNN) regression, neural network regression, and SVM regression), clustering models (mean-shift, K-means), and anomaly detection models (isolation forest, one-class SVM).

ML Model Development and Edge Conversion

The first step in providing machine learning capability to the example edge-computing platform is developing a selected ML model. The next step is edge-converting or "edge-ifying" the model into a form suitable for execution on the edge-computing platform with its constrained resources, and operation in real-time on continuously streaming live data. Finally, the edge-converted model is deployed to the edge platform.

MIL models are typically created in a "development" computing environment, such as a cloud computing environment 412. The models are typically written in high-level programming languages such as Python, R, SAS, Knime, and others. When the models are intended to execute on "live" data in a different "production" computing environment, they may be exported or converted into a common or standard form such as Predictive Modeling Markup Language (PMML), PFA, ONNX, or something similar, to accommodate their deployment from the development environment to the operational environment.

The development and training of new ML models typically involves the use of complex data mining, and model creation, and model training processes and components. Such processes and components typically require and operate on very large volumes of historical or synthesized static data, or a combination, to create and train the models. Substantial storage and computing resources are typically required. Accordingly, a machine learning model to be deployed to and executed on the example edge platform 406, 609 may be suitably developed and trained in the cloud 412 using a model creation component 902, model training component 904, and data storage and aggregation component 573. Model creation and training components 902, 904 may comprise known high-level programming or model development software, or both, such as Python™ (Python Software Foundation), R, RStudio, Matlab® (The Math Works, Inc.), TensorFlow™ (Google), and Spark™ MLlib (Apache). Data storage component 573 may comprise known large capacity digital storage components such as disk or other electronic storage devices. Computing resources may suitably include various known processors.

The aggregated or batched data used to develop and train the model preferably comprises sensor data that was received and processed (including ingestion and enrichment) at the edge platform 406, 609. As previously described, machine learning model developers may programmatically control the ingestion and enrichment functions performed by the analytics and CEP components 429, 435, 535, 538 of the edge platform via API's. Therefore, they may use the edge platform to generate development and training data sets comprising data that has been suitably enriched and formatted for any particular model being developed. These data sets also are substantially semantically identical to the live data on which the model will execute after it has been edge-converted and deployed to the edge platform.

As described herein, models developed for the example edge platform need not and preferably do not include the substantial pre-processing code and functionality that is typically incorporated in models developed for execution on batched data in non-edge-based computing environments. Any pre-processing required by a model developed for the example edge platform can be performed on the edge platform separately from the model by executing analytics expressions in the CEP engine on the ingested and enriched data streams under programmatic control. Such pre-processing may include, for example, contextualization of the data in terms of time, computation, or real-world events, or a combination, data alignment, running statistical or math functions, of a combination, filtering, smoothing, grouping, or aggregation, or a combination, or otherwise forming from one or more streams specific input data streams specified by a particular model. For the same reasons, a model developed for the example edge platform also need not and preferably does not include the post-processing code and functionality typically incorporated in non-edge-based models designed to execute on batched data. Accordingly, the model developer may focus on developing the model itself and assume the inputs and outputs will be pre- and post-processed as required at the edge. Even if the model is developed with pre- and post-processing integrated, the pre- and post-processing components may be and preferably are removed and replaced with equivalent scripts of VEL® expressions when the model is edge-converted and deployed to the example edge platform.

Referring to FIGS. 5 and 9, the data for developing and training the model may be aggregated at the edge platform, for example being stored in the local time-series database 576, and then may be transferred to the cloud 412 by the data publisher 570 component. In the cloud, the data may be stored in cloud data storage 573. The development and training data stored in the cloud also may include other historical sensor data from the edge platform 406, sensor data from connected local networks, sensor data from other networks, or various synthesized data, or a combination. Various predictions, inferences, analytical results, and other intelligence information, e.g., business and operational insights produced by applications, analytics expressions, and machine learning models executing on the edge platform also may be sent to the cloud via the data publisher for use in creating, verifying, evaluating and updating models, as further described below. Enterprise reference data 802 also may be accessed from any available source of such data, for example using an application such as OSISoft, and transferred to the cloud via the data publisher.

Various means and processes for creating and training various known types of machine learning models, such as linear regression models, using batched static data exist, have been published, and are known to persons of ordinary skill in the art, including those identified above. The details of creating and training such models therefore do not require further description herein.

Once the model is developed and trained, the model must be edge-converted or "edge-ified" to make it suitable for deployment to and execution on the edge-computing platform. An edge conversion component 906 is used to edge-convert or "edge-ify" the machine learning model to a form that that is optimized to execute efficiently and rapidly on the edge platform 406, 609, operate on live streaming data in real-time, and produce inferences from the data in real-time. The edge conversion component 906 may be used to convert both standard models and any custom or proprietary models to be incorporated as part of the machine learning software platform 804 of the edge platform.

The edge conversion component 906 may edge-convert the model directly from its native form in a high-level language, such as Python, or from an intermediate form such as PMML, PF A, or ONNX if it was not originally created in that form. Models are often converted from the high-level language in which they were created to an intermediate form such as PMML to accommodate deployment of the model from a development environment to a different operating environment. For purposes of providing a detailed example of the conversion process below, it will be assumed the model has been converted to PMML.

The process of converting a model developed using one of the well-known model development software products or languages, or a combination, to PMML, for example, is well known and conventional and various tools and utilities are available for that purpose. However, converting a model to PMML alone is not sufficient to make it suitable for deployment to and execution on the example edge platform. The model must also be optimized and converted into a form that can efficiently and rapidly execute on the edge platform 406, 609, and that can operate in real-time on the live continuously streaming data received at the platform.

As part of the edge conversion process, the edge conversion component 906 may convert all or part of the high-level model or the intermediate PMML version to an equivalent script of expressions of a suitable analytic expression language, preferably VEL®. This decreases the size and complexity of the model, enables it to run more efficiently and with limited edge computing resources in the edge platform's CEP, and enables it to operate on continuously streaming sensor data in real-time. However, as will be appreciated from the detailed description of an example conversion and optimization process below, a model also may be optimized and converted for execution on the edge platform without necessarily converting it to VEL® or other similar analytics expressions.

Edge-conversion thus enables powerful machine learning models and applications that previously were limited to execution in the cloud to be executed on the example edge platform on continuously streaming sensor and device data in real-time. Another benefit to converting cloud-generated ML models from their high-level native format or an intermediate format into a script of expressions of a common analytics expression language, e.g., VEL®, is that it allows the same edge platform to accommodate a plurality of heterogeneous ML models.

Below in Table 1 is an example of a simplified ML model represented in PMML and created in the typical manner for use in a non-edge computing environment. The model uses logistic regression in a manufacturing environment to infer the probability of an imminent failure condition for a core winding machine based on sensor inputs for winder temperature, wire diameter, winder speed, and wire tension.

TABLE 1

```
<?xml version="1.0" encoding="UTF-8"?>
<PMML xmlns="http://www.dmg.org/PMML-4_3" version="4.3">
<Header>
<Application name="JPMML-SkLearn" version="1.2.11" />
<Timestamp>2017-12-20T18:21:45Z</Timestamp>
</Header>
<MiningBuildTask>
<Extension>PMMLPipeline(steps=[('classifier', LogisticRegression(C=1.0,
class_weight=None, dual=False, fit_intercept=True,
intercept_scaling=1, max_iter=100, multi_class='ovr', n_jobs=1,
penalty='12', random_state=None, solver='liblinear', tol=0.0001,
verbose=0, warm_start=False))])</Extension>
</MiningBuildTask>
<DataDictionary>
<DataFieldname="output" optype="categorical" dataType="double">
<Value value="0" />
<Value value="1" />
</DataField>
<DataField name="winder_temperature" optype="continuous" dataType="double" />
<DataField name="winder_diameter" optype="continuous" dataType="double" />
<DataField name="winder_speed" optype="continuous" dataType="double" />
```

TABLE 1-continued

```
<DataField name="winder_tension" optype="continuous" dataType="double" I>
</DataDictionary>
<RegressionModel functionName="classification" normalizationMethod="softmax">
<MiningSchema>
<MiningField name="output" usageType="target" />
<MiningField name="winder_temperature" />
<MiningField name="winder_diameter" />
<MiningField name="winder_speed" />
<MiningField name="winder_tension" />
</MiningSchema>
<Output>
<OutputField name="probability_0" optype="continuous" dataType="double"
feature="probability" value="0" />
<OutputField name="probability_1" optype="continuous" dataType="double"
feature="probability" value="1" />
</Output>
<RegressionTable intercept="-0.16184083460386395" targetCategory="1">
<NumericPredictor name="winder_temperature" coefficient="-0.06386247081018467" />
<NumericPredictor name="winder_diameter" coefficient="-0.465735130830257" />
<NumericPredictor name="winder_speed" coefficient="-0.32071983393012843" />
<NumericPredictor name="winder_tension" coefficient="0.8294139499847194" />
</RegressionTable>
<RegressionTable intercept="0.0" targetCategory="0" />
</RegressionModel>
</PMML>
```

Table 2 below is an example of a converted or translated VEL® version of the ML model represented in PMML in Table 1 which is adapted for deployment to and execution on the example edge platform 406, 609 on live streaming sensor data in real-time.

TABLE 2

```
# pmml file model: Regression Model
# vel script generated for pmml file: .pmml
# input stream: RegressionModel_input_stream
def stream RegressionModel_input_stream is {
winder_temperature is real,
winder_diameter is real,
winder_speed is real,
winder_tension is real
}
# lambda_softmax lambda
lambda_softmax is fn y: real -> exp(y)
# output local is: RegressionModel_local_stream
def local RegressionModel_local_stream = {
output_1 is (lambda_softmax(
-0.16184083460386395 +
input_record.winder_diameter * -0.465735130830257 +
input_record.winder_speed * -0.32071983393012843 +
input_record.winder_temperature * -0.06386247081018467 +
input_record.winder_tension * 0.8294139499847194))
} select input_record from RegressionModel_input_stream
# output local is: RegressionModel_local_stream_classification
def local RegressionModel_local_stream_classification = {
output _1 is input_record.output_1,
output _0 is exp(0.0),
probability is list(real)([
(input_record.output_1 / sum([input_record.output_1, exp(0.0)])),
(exp(0.0) / sum([input_record.output_1, exp(0.0)]))])
} select input_record from RegressionModel_local_stream
# output stream is: RegressionModel_output_stream
def stream RegressionModel_output_stream = {
output _1 is input_record.output_1,
output _0 is input_record.output_0,
probability is input_record.probability,
probability _0 is input_record.probability[index(list(str)(["output_1",
"output_0"]),
"output_0")[0]],
probability _1 is input_record.probability[index(list(str)(["output_1",
"output_0"]),
"output_1")[0]]
} select input_record from
RegressionModel_local_stream_classification
```

Comparing the PMML version of the model (Table 1) to the converted VEL® version (table 2) generally, it will be appreciated that in the PMML version the model inputs are defined as static sensor data values, whereas in the VEL® version they are converted to definitions of continuous streams of sensor data. Moreover, in the PMML version, discrete sets of static sensor data values are operated upon as inputs in a sequential fashion to produce a sequence of discrete inferences (i e, probability of imminent winder failure) as outputs for each discrete set of input data processed, whereas in the converted VEL® version, continuous streams of input data are operated upon in real-time and produce a continuous stream of inferences as an output that can be acted upon immediately.

Figure 10:
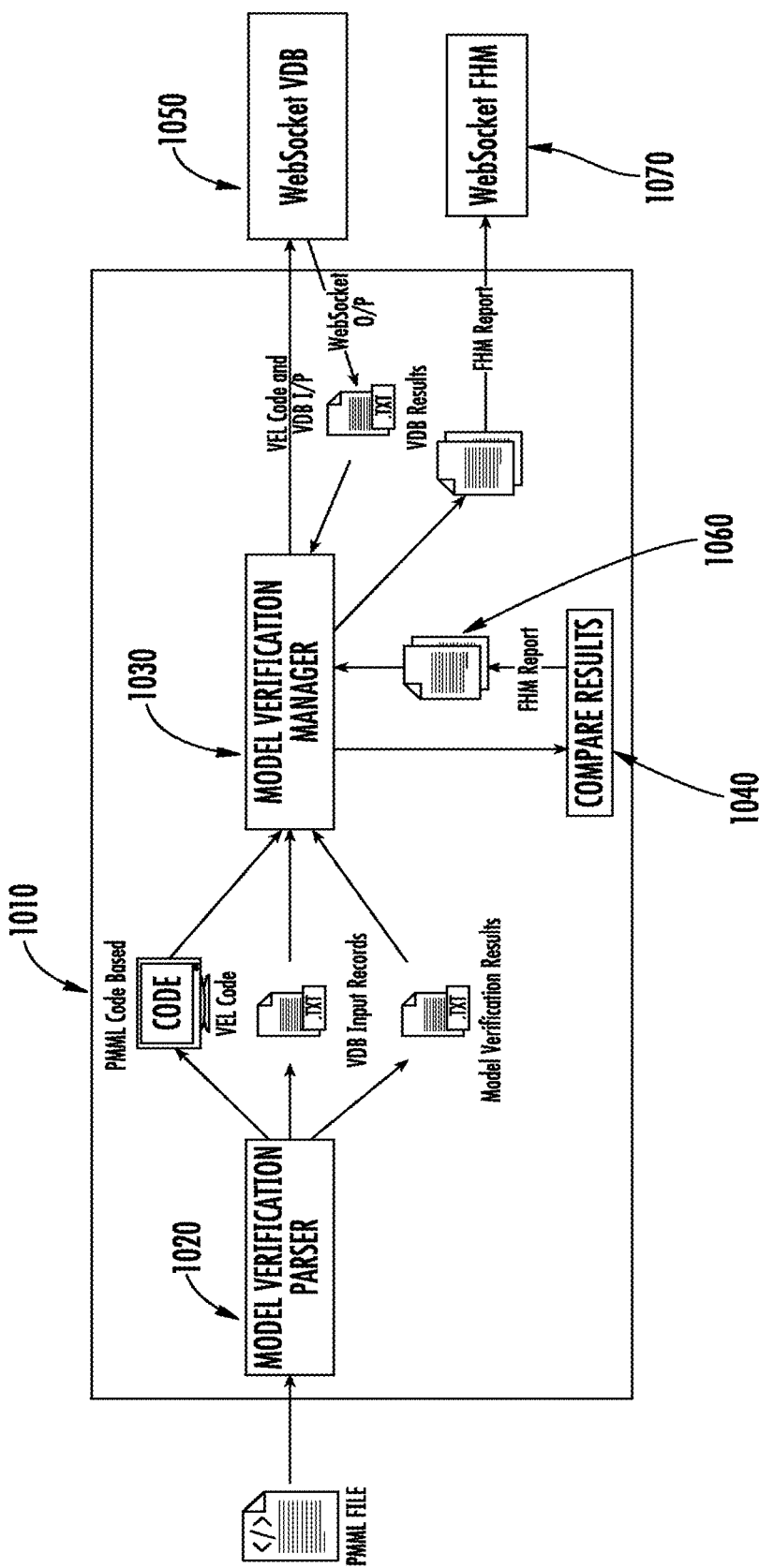
FIG. 10 shows a flow diagram illustrating a method for edge-converting machine learning models for deployment and execution on an intelligent edge computing platform in accordance with an example embodiment.

Referring primarily to FIGS. 9 and 10, the edge conversion component 906 receives a model that has been created and trained using complex data mining, model creation, and model training components 902, 904 and that optionally has been transformed into a standard intermediate format, such as PMML, for deployment. The edge conversion component reads and parses the high-level model code or PMML specification, and can completely or partially convert it to a script of functionally and semantically equivalent analytics expressions, preferably \TEL® expressions, as needed or desired for a particular implementation. It may also remove any integrated pre- and post-processing functions from the model and convert them to equivalent analytics expressions that can execute much more efficiently in the CEP engine separately from the model functions. The conversion to analytics expressions enables the model to execute much more efficiently and rapidly in the CEP engine of the edge platform while retaining semantic equivalence. In addition, the conversion enables the model to execute on continuous streams of live sensor data in real-time rather than static data that has been previously batched and stored.

As referred to previously, certain high-level model language expressions or functions may be suitable for execution on the edge platform in their native form and without conversion to equivalent analytics expressions. In addition, certain models may contain functionality for which there is no VEL® equivalent. In the event that a certain functionality of a particular model has no equivalent in VEL®, the original high-level language code or PMML specification for that functionality may be retained or converted, or both, to equivalent executable code such as C++, which can be executed at run time by binding an appropriate VEL® expression, construct or active object to the code and invoking it. However, it is generally preferred to minimize deploying non-VEL® code in order to maximize the efficiency and speed with which most models execute on the edge platform and to minimize the models' use of resources on the edge platform.

It is noted that there are many parsers available for high-level model languages and for PMML for various cloud-based runtime environments and frameworks. However, such parsers generally are not suitable for implementing machine learning at the edge because of numerous limitations. For example, such parsers typically perform computations as linear algebra or simple expression evaluation. They also do not provide inherent mechanisms for handling the temporal aspects involved in processing multiple asynchronous streams of sensor data at the edge in real-time. Any data pre-processing required to feed input data to the model in the correct format expected by the model is completely left to the developers of applications that may wish to employ the model. Further, such parsers typically are not designed to generate code that is highly-efficient and light on compute demands and that will perform well with limited edge computing resources. Still further, models that comprise multiple chained models typically proceed linearly through a number of unnecessary data/compute representations while being processed in the chain, which is inefficient.

An example translator and method for optimizing and converting trained ML models expressed as PMML from the cloud or any other system or tool into an equivalent efficient VEL® representation overcomes the foregoing deficiencies. The example translator and method effectively and precisely converts PMML to VEL® as a combination of inputs and reactive functions optimized for efficient execution at the edge while addressing that the VEL® code also must be able to process multiple asynchronous streams of sensor or other device data together in real-time. It is understood that the same approach described below may be applied to optimize and convert a model in a high-level language rather than an intermediate form like PMML.

A PMML specification typically includes the following components:
1. Input parameters and types;
2. Any preprocessing step(s) to be performed;
3. The precise ML algorithm to the applied;
4. Any metadata or hyper parameters from the algorithm;
5. Any additional arbitrary computation to be performed;
6. Prediction output and type;
7. Any post-processing step(s) to be performed; and
8. Any chaining with additional ML algorithm(s) (each with the associated components).

The example translator and method take a PMML model file as input and generate as output an equivalent VEL® program with equivalent semantics. The example translator and method preferably support all of the functions, types, algorithms and transformations defined in the PMML specification. The example translator and method may be implemented in C++. All of the ML algorithms specified in the PMML specification also may be implemented in C++ for fast computation at runtime.

The translator identifies the model type of a PMML input and performs model specific VEL® code generation activities. While many models can be represented directly in VEL®, for some complex computations of certain complex models, there may be no direct VEL® equivalent. For these instances, special functions have been built into VEL® and are called directly within the generated VEL® program. For example, models such as the Gradient Boosted Trees (XG-Boost) model and certain kinds of deep neural net models are very complex with thousands of tree nodes. VEL® supports stateful active objects that provide the infrastructure to build such complex PMML models directly as efficient and optimized C++ objects at VEL® program startup time. Once the stateful object is started, predictions are done directly in the native C++ code as the input data for the predictions arrives in the input streams. Stateful actor objects run extremely fast, thus providing high performance real-time prediction for time critical applications at the edge.

The example translator and method preferably translates PMML input to VEL® output in three phases. In Phase 1, the XML content is parsed and a representation is built in memory capturing the semantics, relationships, transforms and ML algorithm technique to build a computation flow graph. In Phase 2, a series of graph and transformation analyses are performed to optimize any computations, club any pre-processing steps, fold operations that can be folded at compile time, and build self-describing structures that pick the right transforms and functions toolkit from the VEL® library of functions and stateful objects. In Phase 3, the structures created in Phase 2 are unrolled and the component pieces are assembled to generate the complete VEL® code object. Phase 3 may include querying the user for any out-of-box input assembling templates to be used. The user also may be offered any post-processing templates to be used. The code is then generated to implement the most optimal VEL® program for the target platform. Any test cases embedded by the ML model creator in the PMML file are also generated as static expectations generated as part of the code generated program itself, so they can be verified at compile time before the model is deployed to the example edge platform. This greatly increases confidence in the accuracy of the VEL® code-generation.

An example PMML specification to VEL® code translation is demonstrated in connection with tables 3 and 4 below in a manufacturing use-case environment. In the example, a machine makes aluminum rolls that are used in electric capacitors. The longevity and health of the electric capacitors are related to the health and manufacturing conditions associated with each aluminum roll made. Accordingly, it would be very useful to predict whether an aluminum roll is good or bad in real-time as the manufacturing process is happening.

The PMML specification shown in Table 3 describes a predictive machine learning model that uses Logistics Regression as the machine learning algorithm. The model has been trained in the cloud and it is now desired to deploy it to an edge platform of the plant at which the aluminum rolls are being manufactured to predict the health of the rolls in real-time and live as the manufacturing process is in progress. In this use case there is no time to look at the data post-hoc; the more delayed the prediction, the higher the chance of incurring costly scrap.

TABLE 3

<?xml version="1.0" encoding="UTF-8" standalone="yes"?>
<PMML xmlns="http://www.dmg.org/PMML-4_3" version="4.3">
<Header>
<Application name="JPMML-SkLearn" version="1.2.11"/>
<Timestamp>2017-12-20T18:21:45Z</Timestamp>

TABLE 3-continued

```
</Header>
<DataDictionary>
<DataField name="output" optype="categorical" dataType="double">
<Value value="0"/>
<Value value="1"/>
</DataField>
<DataField name="temp" optype="continuous" dataType="double"/>
<DataField name="diameter" optype="continuous" dataType="double"/>
<DataField name="speed" optype="continuous" dataType="double"/>
<DataField name="tension" optype="continuous" dataType="double"/>
</DataDictionary>
<RegressionModel functionName="classification"
normalizationMethod="softmax">
<MiningSchema>
<MiningField name="output" usageType="target"/>
<MiningField name="temp_transformed "/>
<MiningField name="diam_transformed"/>
<MiningField name="speed_transformed"/>
<MiningField name="tension_transformed"/>
</MiningSchema>
<RegressionTable intercept="-0.16184083460386395"
targetCategory="1">
<NumericPredictor name="diameter"
coefficient="-0.465735130830257"/>
<NumericPredictor name="speed"
coefficient="-0.32071983393012843 "/>
<NumericPredictor name="tension" coefficient="0.8294139499847194"/>
</RegressionTable>
<RegressionTable intercept="0.0" targetCategory="0"/>
<Local Transformations>
<DerivedField name="temp_transformed" dataType=" double"
optype="continuous">
<Apply function="/">
<Apply function="pow">
<FieldRef field="temp"/>
<Constant dataType="double">2</Constant>
</Apply>
<Constant dataType="double">100</Constant>
</Apply>
</DerivedField>
<DerivedField name="diam_transformed" dataType=" double"
optype="continuous">
<Apply function="/">
<Apply function="pow">
<FieldRef field="diameter"/>
<Constant dataType="double">2</Constant>
</Apply>
<Constant dataType="double">25</Constant>
</Apply>
</DerivedField>
<DerivedField name="speed_transformed" dataType=" double"
optype="continuous">
<Apply function="/">
<Apply function="pow">
<FieldRef field="speed"/>
<Constant dataType="double">2</Constant>
</Apply>
<Constant dataType="double">10</Constant>
</Apply>
</DerivedField>
<DerivedField name="tension_transformed" dataType="double"
optype="continuous">
<Apply function="/">
<Apply function="pow">
<FieldRef field="tension"/>
<Constant dataType="double">2</Constant>
</Apply>
<Constant dataType="double">8 5</Constant>
</Apply>
</DerivedField>
</LocalTransformations>
</RegressionModel>
</PMML>
```

The equivalent translated VEL® code corresponding to the PMML (XML) specification is shown in table 4.

TABLE 4

```
# pmml file model: RegressionModel
opcua_type is {ts is int, value is real, serverTs is real}
def stream winder_temp is opcua_type
def stream winder_diam is opcua_type
def stream winder_speed is opcua_type
def stream winder_tension is opcua_type
def stream regressionmodel_input_stream = {
temp is d1.value,
diameter is d2.value,
speed is d3.value,
tension is d4.value
} select d1 from winder_temp
with d2 from winder_diameter
with d3 from winder_speed
with d4 from winder_tension
def local regressionmodel_transformed_stream =
map2(
map(data, fn is a:real -> a^2),
{100, 25, 10, 8.5},
fn is p:real, q:real -> p/q
) select data from regressionmodel_input_stream
lambda_softmax is fn y:real -> exp(y)
def local regressionmodel_local_stream = {
output_1 is (lambda_softmax(
-0.16184083460386395 +
input_record.diameter * -0.465735130830257 +
input_record.speed * -0.32071983393012843 +
input_record.tension * 0.8294139499847194))
} select input_record from regressionmodel_transformed_stream
def stream regressionmodel_final_output_stream = {
output _1 is input_record.output_1,
output _0 is exp(0.0),
probability is list(real)([
(input_record.output_1 / sum([input_record.output_1, exp(0.0)])),
(exp(0.0) / sum([input_record.output_1, exp(0.0)]))])
} select input_record from regressionmodel_local_stream
```

Comparing the PMML specification to the translated edge-converted VEL® code, it is first seen that in the PMML specification, the various data inputs are identified statically and their respective data types declared under <DataDictionary>. In the corresponding section of the VEL® program, input data streams are identified and defined using "def stream" declarations. The data stream definitions in the VEL® code are more extensive than the data input and type declarations in the PMML specification in part because the PMML specification assumes the input data has already been aggregated, cleansed, and contextualized, whereas the edge-ready VEL® code assumes the input data will comprise raw sensor data streams to be processed in real-time. Therefore, the PMML specification is more static in nature while the \TEL® version has a more continuous temporal nature.

In addition, the PMML specification assumes that the input data has been preprocessed such that the various inputs are aligned, i.e., data elements from one sensor are aligned in sequence or time frame with corresponding data elements from other sensors. In general, machine learning models do not work well or provide accurate results with data inputs that are not well-aligned. Thus, the PMML specification just describes the data inputs and their types and assumes that application developers will perform the necessary data preprocessing before the data is input to the model. In contrast, edge-converted VEL® code assumes that the data elements from various sensors will arrive asynchronously and must be aligned in sequence or time frame and relevance before being input to the model. The translator and method thus first absorb the PMML specification to understand the various data inputs and their types and interactions. The translator and method then map the various PMML data inputs to corresponding "real-world" sensor data stream inputs by name, device type and data type. The translator may automatically offer smart mapping to "real-world" sensor data streams that align on name, device, and data types for a user to select. Numerous pre-packaged templates can be pre-developed and made available for the user to pick the exact alignment semantics desired without any additional coding or development work being necessary.

In the present example, it is desired to generate a prediction each time a fresh data value is received from each of four sensors for temperature, diameter, speed, and tension, where the sensors are producing the data values asynchronously and not in time alignment with each other. In the VEL® code, after the various sensor data streams are identified and defined as described above, the plurality of data values comprising each stream can be combined into an input stream "def stream regression model_input_stream" for the logistic regression model as shown. Then, corresponding time-aligned ordered sets of four sensor data values can be joined as a series of data sets for input to the model. The "select" command used with the "with" keyword signifies an AND-JOIN across all four sensor data streams and is automatically perfectly time aligned in-order for real-time processing by the VEL® CEP engine.

Thus, just by simply allowing a user to select between two real-time join options, the translator and method can map the PMML data inputs to real world sensors and auto-generate semantics across the space-time continuum on how to combine, pre-process and precisely align data for the prediction algorithm. This is a huge benefit in simplifying the level-of-abstraction for the user and in simplifying the model deployment workflow. Without this, the model predictions would be pretty much meaningless in a live edge environment. While the particular example employs an AND-JOIN function to combine, pre-process and precisely align data from multiple sensor data streams for input the prediction algorithm, VEL® implements numerous other first-class temporal semantics (e.g., OR-Joins, Windowing, Pattern Matching, Polymorphic function applications, Math/Stats functions, Signal processing primitives, and others) that work across any N number of streams automatically code-generated without any application developer effort. The existing state of the art has no such provisions for actually making a machine learning model ready for real-time data flow processing at the edge.

The PMML specification fails to capture the business context needed for operation at the edge in a real operating environment. It provides a static specification that is more suited to operation on batched sets of static data than on real-time streaming sensor data. For example, it simply indicates that input data from four sensors are required for the model to produce a prediction, but fails to indicate anything about "when" the input data set is be provided to the model. Further specification is required to define whether the data will be provided when all the sensors have produced data values and all the values have been received, or when any sensor produces a data value, in which case old values might be used for the other sensors. In the converted VEL® code, the temporal aspects of the input data for the model as well as the sources and types of the data are defined and specified. This further specification makes it possible for the model to operate in real-time on streaming sensor data at the edge in real-world environments.

Another point is that because of how models intended for use with batched sets of static data are trained and translated to common specifications, such as PMML, the PMML specification only defines the data inputs required by the model generically and without consideration of the form in which such data may be received in the real-world in a real-time operating environment. For example, the PMML specification defines the "temp" input data as a "double value" type. However, in a real world application, a temperature sensor producing actual temperature data may and probably will use an OPCUA protocol and each sensor data value it produces may contain a host of meta-data along with an actual data packet. Thus, for the PMML specification model to be operable with real-world data at the edge requires at least additional logic to be included to retrieve the actual temperature data required by the model. In contrast, since VEL® is structurally typed, it is very easy to match the required input data in a sensor data stream and apply it to the model.

The foregoing example of conversion or translation of a PMML specification to equivalent VEL® demonstrates how the PMML specification has been parsed, and the inputs (for the ML models) have been mapped to real-world events by providing numerous temporal abstractions as a series of corresponding data value selections. This solves one of the biggest challenges of deploying a ML model in a real-time data flow processing environment. In the next phase, the translator and method analyze the various transformations (computations) involved with the inputs, their relationships, the actual ML algorithm, and any post-processing steps of the PMML model. This analysis may be performed as a single-step but with multiple sub-phases repeated to optimize the code-generation by building a holistic view of the execution model. Most traditional methods take the approach of implementing these as just a sequence of to-do steps for execution while the method described herein takes a very different holistic approach similar to a compiler. The goal is to not only generate VEL® code that is semantically equivalent to the PMML version, but to generate code that is run-time optimized for the edge computing environment. Throughout the process of generating the VEL® code from PMML, the multiple sub-phases repeatedly apply the techniques of constant folding, exploit SIMD (single-instruction; multiple data) computation, chipset atomics, graph optimizations and parallel code execution wherever applicable.

Again comparing the corresponding PMML specification and converted VEL® code, the PMML specification specifies a data transformation on the inputs as a pre-processing step, which is very common for ML models, before feeding the data to the ML model. The data transformation comprises squaring each of the input fields, and then dividing each of the input fields with a specified co-efficient calculated as part of the training of the ML model. The data transformation is implemented separately and serially on each sensor data input for temperature, diameter, speed, and tension in a corresponding <DerivedField> section.

Employing single-step multiple sub-phase analysis and code generation, the multiple serially-implemented data transformations can be implemented as a single line of VEL® code operating on data sets in parallel and with optimizations built in. This is illustrated in the VEL® code as the data definition "def local regressionmodel_transformed_stream= . . . ", wherein "data" is operated on with square and division functions, and the data on which the operations are performed comprise serial sets of parallel data values selected by the command "select data from regressionmodel_input_stream."

In this example, the single-step multiple sub-phase analysis results in optimized VEL® code in which an intermediate local stream is first generated that exploits SIMD (single-instruction multiple-data) to perform the same squaring operation (a^2) on all inputs simultaneously. Then the resulting data values of the array are divided with respective indexed coefficients ({100, 25, 10, 8.5}). The optimization is implemented with two nested function applications "map2" and "map." "Map" operates on the record comprising data values "temp," "diam," "tensions," and "speed" with the function "fn is a:real→a^2." In "map," each record item is squared and an SIMD instruction is generated to cause the CPU of the edge platform to perform the function on all record items as a single instruction. "Map2" operates on the output of "map," the coefficient record {100, 25, 10, 8.5}, and a lambda that describes the transformation (division) "fn is p:real, q:real→p/q." Once the two arrays or records are loaded, the division function can be performed as a single CPU instruction on corresponding data values of the arrays in parallel. This optimizes the overall computation and allows it to execute faster in a real-time streaming computation environment.

This is significantly different than traditional approaches in which the same operations are just repeated iteratively for each element of a record (e.g., in a loop). In the traditional approach each element of the record or array would be individually squared and then divided by the respective co-efficient. This approach comprises long multi-step sets of instructions to be performed by the CPU repetitively which is inefficient and time-consuming. In comparison, the equivalent translated and optimized VEL® code comprises a single-step instruction for the CPU to execute at runtime, which allows much faster execution as is necessary for real-time processing of continuous sensor data streams.

Another example of the optimization performed by the translator and method is transparent data representation to the user. VEL® offers tensors (N-dimension) and matrix (2-dimension) as first-class types with manipulation primitives being exposed in a very similar way. This allows for the most optimal form of internal data representation to be used for each instance of data storage without necessary back and forth transformations such as is typically necessary for a Python machine learning library to perform. Hundreds of other such layers of optimizations and smart techniques may also be included in the PMML to VEL® translator and method to exploit the inherent advantages of VEL® as described herein and in the patents and applications of the present assignee incorporated herein by reference.

Those skilled in the art will appreciate that while the foregoing examples describe translation from PMML to VEL®, the same methodology can also be used to generate VEL® code from various other well-adopted machine learning libraries and formats such as Tensorflow, ONNX, XGBoost, and MLPACK. For instance, one could use XGBoost to train a model in R or Python and then export the model into an XGBoost serialized format. This could then be transformed into a semantically equivalent edge-converted and optimized VEL® program directly providing an interface to the most commonly used ML libraries.

Referring primarily to FIG. 10 and as mentioned previously, the translator and method can also incorporate verification of the generated VEL® code model against the PMML version of the model to better ensure accuracy. This aspect of the translator and method are referred to in FIG. 10 as the PMML Code Base 1010. The PMML Code Base parses the PMML model, generates the functionally and semantically equivalent VEL® code model, and verifies the VEL® code model against the PMML model. The PMML Code Base includes a model verification parser 1020, a model verification manager 1030, and a compare results component 1040. The PMML model is initially input to the model verification parser. The model verification parser parses model verification tags indicated in an <Inline Table> node in the PMML model, generates input data according to a <Mining Schema> node, and generates expected output data from the PMML model according to an <Output> node. The model verification parser then processes the input data and expected output data respectively and generates input and expected output data in a VEL® debugger format. This is done to facilitate comparing the results produced by the generated VEL® code model with the expected outputs according to the PMML code model as described further below. The model verification parser then sends the generated VEL® code model, the formatted VEL® debugger input data, and the PMM model verification expected results to the model verification manager.

The model verification manager primarily functions to manage communications between the various components. The model verification manager receives the outputs from the model verification parser and sends the generated VEL® coded model and VEL® debugger data input to the VEL® debugger, for example via a web socket, e.g., WebSocket VDB 1050. The VEL® debugger is an interactive program that is useful for writing, editing, testing, and debugging VEL® scripts. A VEL® script to be tested can be compiled and executed by the VEL® debugger on input data provided to the debugger, and the debugger can output the results for analysis. In this instance, the VEL® debugger executes the generated VEL® coded model on the VEL® debugger input data and returns the results to the model verification manager via the web socket. The model verification manager in turn forwards the VEL® debugger results to the compare results component.

The compare results component compares the output results produced by the generated VEL® code model as executed by the VEL® debugger with the expected results from the PMML model verification tags and sends a report back to the model verification manager. The model verification manager compares the output results of the VEL® code model from the VEL® debugger with the expected PMML model verification results and generates a report 1060 indicating whether the generated VEL® coded model produced the expected results, the actual results it produced, and whether it passed or failed. The model verification manager then sends the report to the edge manager 547 (see FIGS. 5 and 9), for example via a web socket, e.g., WebSocket FHM 1070, where it can be displayed on a user interface. It will be appreciated that while the foregoing verification method is described with respect to conversion of a model in the intermediate PMML form, the same approach is applicable to verify conversion of a model in a high-level model language, such as Python.

Referring again to FIG. 9 primarily, after a cloud-created ML model has been edge-converted or "edge-ified," which includes both standard models and deep learning models, the model may be deployed to the example edge platform 406, 609 over the Internet, or via other networks or connections. Deployment of the model from the cloud to the edge platform is managed between the edge manager 547 and cloud manager 552 (see also FIG. 5) of the edge and cloud software platforms respectively. In that regard, while FIG. 9 illustrates the cloud manager 552 as being part of the cloud 412 and the edge manager 547 being part of the edge platform 406, 609, it will be appreciated that the cloud manager and edge manager each may reside and execute on other computing platforms in other networks and communicate with each other and with the cloud and edge platform respectively via Internet or other network connections.

The edge-converted models may be deployed directly from the cloud to the edge or may be deployed from the cloud to an app store 637 (see also FIG. 6) and from the app store to the edge platform. As previously indicated, it is preferably that the models are containerized using the SDK 564 (FIG. 5) so that they can be deployed to and execute on various different edge and other platforms having various different computing and other resources.

Edge-converted models deployed to the example edge platform 406, 609 are managed on the platform by the machine learning software platform 804. The machine learning platform can be accessed via a suitable user interface (UI) and incorporates functionality for selecting one or more standard or custom machine learning models, setting model parameters, training models, causing models to execute on live sensor data, stopping model execution, exporting models and model configurations, and evaluating, verifying, and updating models as necessary. The edge-converted models execute efficiently on the CEP engine to generate predictions and inferences that can be used by edge applications alone or combined with other inferences, analytics results, and intelligence generated by other models, applications, analytics expressions, and others in real-time from live streaming sensor or other data. The predictions, inferences, and other analytics results and intelligence can be transferred from the edge platform to the cloud 412 via the data publisher 570, as well as to other edge platform instances, to the local network, or to other networks. They can also be used to determine whether to take actions in the local network with respect to control systems, machines, sensors and devices 523, or the like, or to provide information, or a combination, alarms, warnings, and others, for example to a management system user interface 908 of the local network.

Iterative Closed-Loop Updating of Edge-Based ML Models

Once an edge-converted ML model is deployed to the edge platform and begins operating on live sensor data, it may be desirable to periodically evaluate the accuracy of the predictions, inferences, and other outputs generated by the model and iteratively update the model as necessary. Degradation in model performance over time is not unusual and may have a number of causes, including variance or degradation in sensor outputs over time, changes in the local environment, and others. Degradation in model performance may be manifested as increased latency in generating inferences from the data and decreased accuracy of inferences.

Referring to FIGS. 8 and 9, a closed-loop arrangement between the edge platform 406, 609 and the cloud platform 412 provides for periodic evaluation and iterative updating of ML models on the edge platform. Predictions, inferences, and other model outputs, sensor data from which the predictions and inferences were generated, and other analytics results can be transferred periodically from the edge platform 406, 609 to the cloud platform 412. Other information, such as enterprise reference data 802 also may be transferred to the cloud. Such information may be useful in evaluating prediction accuracy or as a check of model output against required specifications.

The transfer of such data and information to the cloud may be initiated manually either at the edge platform or the cloud, or may be triggered automatically, for example based on a predetermined period of time elapsing, or detecting a variance in model output exceeding a predetermined value. For example, selected analytics expressions implementing logic, mathematical, statistical, or other functions, or a combination, may be executed in the CEP of the edge platform on a stream of inferences generated by a model. The analytics expressions can be selected to effectively define what constitutes an unacceptable level of drift or degradation of accuracy for the model in response to selected input sensor data and to track the model output to determine if the accuracy has degraded or drifted beyond the acceptable limit. For example, the analytics expressions may determine a statistical characteristic of the inferences over time, such as a mean, average, statistically significant range, or statistical variation. The expressions may compare the model output to the determined characteristic or against a stored or otherwise provided value defining an acceptable limit and thus determine whether the accuracy of the model has drifted or degraded by an unacceptable level. If so, the edge platform may automatically take action. Such action may include, for example, recording a certain volume of raw sensor data input to the model and perhaps the corresponding model outputs in response to such data, and sending it to the cloud for re-training/re-evaluation of the model. The predictions, inferences, and any other data may be transferred to the cloud over the Internet or via another suitable network or other connection.

On the cloud platform 412, the transferred predictions, inferences, data and analytics results, and other information can be aggregated in cloud storage 573. The transferred data and information in the cloud storage may then be used and operated on by the data mining, model update, and verification components 902, 904 to evaluate the accuracy of the edge-based model results and to further tune the edge-based model as necessary or desirable. For example, a cloud-based model trained on massive volumes of data and information of the same type as transferred from the edge platform may operate on the data and information transferred from the edge platform and generate outputs such as inferences. The outputs generated by the cloud-based model may be compared to the outputs generated by the edge-based model. If an unacceptable variance is determined, an updated version of the edge-based model may be produced in the cloud, for example by varying weight factors, coefficients, or parameters of the model's algorithms. The updated cloud-based model can then be edge-converted by edge conversion component 906 as described above and re-deployed back to the edge platform.

The closed loop arrangement also beneficially provides a mechanism for multiple ML models to be developed, deployed to the edge, and compared for the best performance and accuracy. In one example workflow, one or more different ML models, perhaps with different hypotheses and parameters, may be generated and trained in the cloud using the same aggregated sensor data. The models are then deployed to the edge and executed on live sensor data at the edge. The results produced by the models are sent back to and evaluated in the cloud to determine which model produces the most accurate results. The most accurate model may then be selected for use. In use, the inferences and predictions generated by the selected model from the live sensor data are repeatedly sent to the cloud for evaluation. In the cloud, the model may be updated, for example by varying weight factors, coefficients, or parameters. The updated model or weight factors, or a combination, coefficient, or parameters are then re-deployed to the edge to replace the current model, weight factors, coefficients, or parameters. As a result, the edge-based models are constantly learning, and becoming better trained and more intelligent over time, and can come to produce very high fidelity results, equal to and sometimes even more accurate than can be produced by humans. This continuously iterative closed-loop arrangement between the cloud 412 and edge platform 406, 609 thus effectively provides AI at the edge. The arrangement also can be used to implement machine learning as a service if desired.

Dynamic Non-Disruptive ML Model Update and Replacement

Another feature of the present invention in connection with the above-described iterative closed-loop machine learning system is the provision of dynamic non-disruptive ML model and weight updates during real-time data-flow processing. One of the biggest challenges in deploying ML models in production, especially in real-time streaming environments, such as resource constrained IoT environments, is model upgrades and updates. Typically, if a new or updated model is to be deployed to the edge platform to be executed on live sensor data, it requires shutting down execution of the existing model while it is replaced by the new or updated model. Similarly, if it is desired to update a model in place on the edge platform rather than replacing it, for example by updating the values of certain weights or coefficients, it is necessary to shut down execution of the model while the updates are made. Shutting down execution of a model under either circumstance is undesirable in that the real-time processing of live data by the model is lost for as long as the model is shut down. During the shutdown, the edge platform could thus miss certain occurrences indicated by the data. Also, in certain circumstance an interruption in the model processing the data could have an impact on the accuracy of inferences produced by the model when execution resumes.

An alternative might be to deploy and execute the new or updated model in parallel with the existing model and then take down the existing model. This approach, however, is inefficient and unsuitable for resource constrained edge computing environments. While such an approach might work in a distributed cloud computing environment with essentially unlimited compute and storage resources, it is unsuitable for distributed IoT edge environments which typically have only limited computing resources and connectivity. In that environment, the parallel deployment and execution approach simply does not work or scale.

To implement dynamic non-disruptive ML model and weight updates during real-time data-flow processing, a stateful subsystem responsive to the semantics in the real-time data flow is provided. The stateful subsystem provides the ability to dynamically replace and update existing models on the edge platform without interrupting or disrupting the real-time processing of data and output of inferences by the models. The subsystem couples with the real-time sensor data flow semantics without disrupting the existing flow of streaming data or its evaluation by the existing model.

The stateful subsystem instantiates an instance of the replacement model by reading the new replacement model and coupling it to the same semantics of the same real-time data streams as the existing model is coupled to. Alternatively, the subsystem instantiates an instance of the existing model, reads the new weights to be applied, and updates the weights in the instantiated version of the model before coupling the instantiated and updated model to the same semantics of the same data streams as the existing model being updated. The replacement model or weights, or both, may be read from the cloud, another repository, or from a stream. In either approach, the processing of the data streams by the existing model is not disrupted as the new or updated model is brought on-line.

Table 5 below provides an example expressed in FogHorn's VEL® language using a stateful subsystem identified as actor_t (a perceptron) for instantiating model updates such as updated weights associated with a TensorFlow-based neural-net model. In this example, the model is generating an on-going real-time prediction of imminent car-crash at a particular railroad crossing using as input the video feed from a camera at the junction. It will be appreciated that in such a critical application, as in many others, it is important to be able to replace or update a model operating on a live data stream without any interruption in the real-time processing of the data stream or in the series of real-time predictions produced by the model.

TABLE 5

```
def stream video_input is frame(720, 480, 3)
def stream ml_model is {name is str, id is int}
startup {
my_model = {name is 'crash.pb', id is 101}
}
# this is an actor_t that instantiates the model by reading the model
def stream ml_actor = tensorflow_actor.load(data) select data from
ml_model
def stream predicted_crash = (latest ml_actor).predict(input_data)
select data from video_input
```

The "def stream video_input" statement defines the input data stream for the model as a real-time continuous stream of video frames from the video camera at the junction. The frames are specified as being 720*480 pixels in width*height. Three ("3") channels are specified to describe Red, Green, Blue (meaning the frames are in color).

The statement "def stream ml model is {name is str, id is int}" defines a stream that represents the existing current machine learning model. Defining the machine learning model itself as a continuous stream that is subject to change at any time, similar to a sensor that is continuously outputting new values, is a key to achieving non-disruptive dynamic updating or replacement of the current model. While a trained model typically is just a single static artifact or entity that may operate on a stream of input data, defining the model itself as a serialized stream that can change at any time completely changes the model for computation purposes. By representing the model itself as a stream, real-time dataflow semantics can be used to reason about the model itself. Thus, instead of describing the model as a static artifact (which is what is done in other systems) the system and method described herein treat the model as a continuous stream that is subject to change at any time and that continuously streams on the edge computing platform along with the one or more input data streams being processed by the model.

In the "startup" block, the "ml_model" stream is initialized with an initial version of the model by initializing the stream "my_model" with the initial version of the model. In this example, the name of the initial version of the model is "crash.pb" and "101" is a unique identifier for the model. How the model is actually stored, whether on disk or in memory, is thus completely abstracted to the user. This allows for a representation that is device, system and computer agnostic as it could be implemented in any possible way.

The statement "def stream ml_actor" defines a stream "ml_actor" that is generated by an actor "tensorflow_actor" acting upon the "ml_model" stream. The "tensorflow_actor" is a built-in Vel® primitive that recognizes and understands the semantics of TensorFlow and leverages its runtime model to perform computations based on the semantics. It is built upon a stateful subsystem called "actor_" that is designed to understand stream semantics. The actor_t subsystem provides flexibility in terms of embedding any arbitrary stream compute functionality but still encapsulates all the first-class temporal streaming capabilities. The "tensorflow_actor" is instantiated by the actor_t subsystem when it detects a change in the stream "ml_model."

As noted above, the model stream "ml_model" initially represents an initial model "crash.pb" at startup. Thereafter, as the initial model is changed, "ml_model" represents whatever is the currently existing model at any point in time. The "tensorflow_actor" is instantiated in real-time in reaction to a detected change in the "ml_model" stream. The "tensorflow_actor.load( )" reads the initial "crash.pb" or subsequent changed serialized model from the stream "ml_model" and builds an in-memory state and execution sub-system of its own which implements the model as read from the stream together with any new changes or updates. It then generates the stream "ml_actor" which represents the new or updated model. The model stream, first containing the previous model, and then instantaneously the updated model, is aligned with the stream(s) of data to be processed by the model. This method of propagating model changes downstream in real-time along with the input data stream being processed thus allows the model to continue to process the input data stream as the model is updated or replaced without shut down or interruption. This method of propagating model changes downstream along with the input data stream is repeated every time a change is detected in the stream representing the then-current model.

It is noted that the constructor actor_t preferably is also represented as a stream with a type defined as actor. This method of allowing a richer constructor to be represented as a stream type allows extending the streaming semantics to a much high-level of abstraction and provides compact representation.

Because "ml_actor" is a stream representation of the new or updated model constructed in real-time by "tensorflow_actor," it can be used to perform predictions based on the input stream of video from the camera. These predictions are represented in the "predicted_crash" stream defined in the "def stream predicted crash" statement. The "(latest ml_actor).predict(input_data)" and "select data from video_input" portions of the statement together comprise an instruction to keep receiving the video input stream as long as it continues and to continuously produce a stream of predictions using the most current version of the model as represented in the "ml_actor" stream.

As long as data continues to be received from the "video_input" stream, the VEL® code according to the example will cause the latest representation of the model that exists in the "ml_actor" stream to be used to continuously perform predictions on the data as it is received. It will be appreciated that since both the actor "ml_actor" and the model "ml_model" are represented as continuous streams, a new model can be inserted into the stream at any given point in time and as many times as necessary or desired without interrupting either the processing of the incoming video data stream or the continuous stream of predictions produced by the model. Each time the current model is to be updated or replaced, the change will be propagated downstream and reflected in the "ml_model" stream. This in turn will trigger a change in the "ml_actor" stream and build a new model state atomically in real-time. The model predictions will just continue with the new input video as if nothing had happened, however, the new model will have taken effect. Accordingly, in one instant of time the old model is used to produce a prediction based on the input data stream as it exists at that instant, and immediately thereafter at another instant of time the new updated or replaced model is used to produce a prediction based on the input data at that instant.

Thus, as described above, it will be appreciated that a key aspect of the system and method described herein is that there are no "blips" in the prediction continuum. Every data point in the input data stream is evaluated for each prediction. This clearly is a very desirable attribute for a mission critical real-time ML model. Moreover, with the system and method described herein models can be updated or replaced seamlessly and without manual intervention, other than to insert the desired model changes or the new model into the input stream.

It also will be appreciated that for a practical system such as described in the foregoing example, it is very important that the flow of real-time predictions is not interrupted no matter how many times or when it may be necessary or desirable to update or replace the machine learning model. The few lines of VEL® program in connection with the example achieve that purpose. Thus, in the system and method described, in which the models are represented as serialized streams, which are inherently designed to change over time, and in which changes to a current model are propagated downstream as a chain reaction along with the input data stream being processed, changes to an existing model can be made without disrupting or interrupting the real-time processing of the input data stream by the model or the continuous stream of predictions produced by the model while it is being updated or replaced.

It will further be appreciated that the system and method described herein can support and encompass numerous ways to update a current machine learning model on the fly by inserting the new or updated model into the model stream. Update can be accomplished via a manual deployment of a new configuration into the model stream. It can be triggered from an upstream analytic or machine learning model. An auto-update of a newly trained model in the cloud can be pushed to the edge via an appropriate network connection. It can also be initiated by a version control management system of the edge or cloud.

Seamless Model Chaining, Orchestration and Pipelining

Yet another feature in connection with the above-described iterative closed-loop machine learning system is the provision of seamless chaining, orchestration, and pipelining of multiple machine learning models.

Except in very specific and narrow use cases, most practical IoT deployments involve a plurality of ML models deployed to perform monitoring, predictive maintenance, and other functions. Thus, a typical IoT environment may involve deploying a few tens to hundreds of sensors and executing at least a few if not more ML models to process the data streams produced by the sensors.

There are many possibilities for which models may be deployed, what data they may use, and how they be chained with each other to produce desired results. In many real-world deployment scenarios multiple ML models are logically built upon one another as a layered stack with the models operating on both raw sensor data and information from other models. In other scenarios, multiple competing models are deployed together and their results are observed to determine which models perform better or to reduce bias from one model's prediction and compare it with an actual event. Such scenarios lead to a fairly complex dependency graph for chaining and orchestration of the various models, and developing special infrastructure to maintain the chaining and orchestration to achieve desired results presents a fairly daunting problem. In fact, it is possible for even the passage of time alone to trigger a need to chain models in certain ways or to change an existing chaining arrangement.

In a dynamic environment as described above including multiple models, continuous model updates, a complex pipeline of models and the sequences in which they should be run relative to each other, the system and method described herein exploit the reactive nature of the real-time data flow systems and methods themselves and rely on the "flow-of-data" itself as an effective chaining mechanism. Thus, the system and method described herein envision the entire running edge system/device as a data-flow graph with continuous endless streams.

It is envisioned that the various streams can comprise data, passage of time tokens, explicit control triggers, or other items of information all bundled into a single layer of abstraction referred as "topics." Each topic belongs to a unique namespace in which is shared data, time passage tokens, control signals, or other information, or a combination. Topics can incorporate one or more sub-topics. Topics and sub-topics are accessed via a publish-subscribe infrastructure over a data bus for example. Publish-subscribe infrastructures, although known for other purposes, have never to the inventors' knowledge been suggested for use as a seamless model chaining and model pipeline mechanism.

In the current chaining, orchestration and pipelining system and method, one or more ML models deployed are bound to one or more topics and sub-topics by name as inputs, outputs, inputs or outputs. The binding between various models and topics as inputs and outputs, or both, allow data, signals, and other information to be communicated and shared between models via common topics on a publish-subscribe infrastructure over a data bus for example. Thus, any of one or more ML models bound to one or more topics may publish data or information to any or all of the topics and any of one or more other ML models may subscribe to any one or more of the same topics and use it to organize either the flow of data or control within the flow.

The same system and method can be used to create any arbitrary chain of data or control flow involving any number of models without having to explicitly or specifically create or set up the chain between individual models. This level of abstraction helps to simplify a user's thinking when implementing individual models so that the user need only consider a model as just comprising one or more inputs, compute stages, and outputs bound to one or more desired topics. The user need not consider which inputs and outputs of various other models to connect and in what sequence. Using this approach as a building block, one can arbitrarily construct systems of interconnected chains of sensors, or other data producing devices, and machine learning models of essentially unlimited complexity, number and size.

Figure 11:
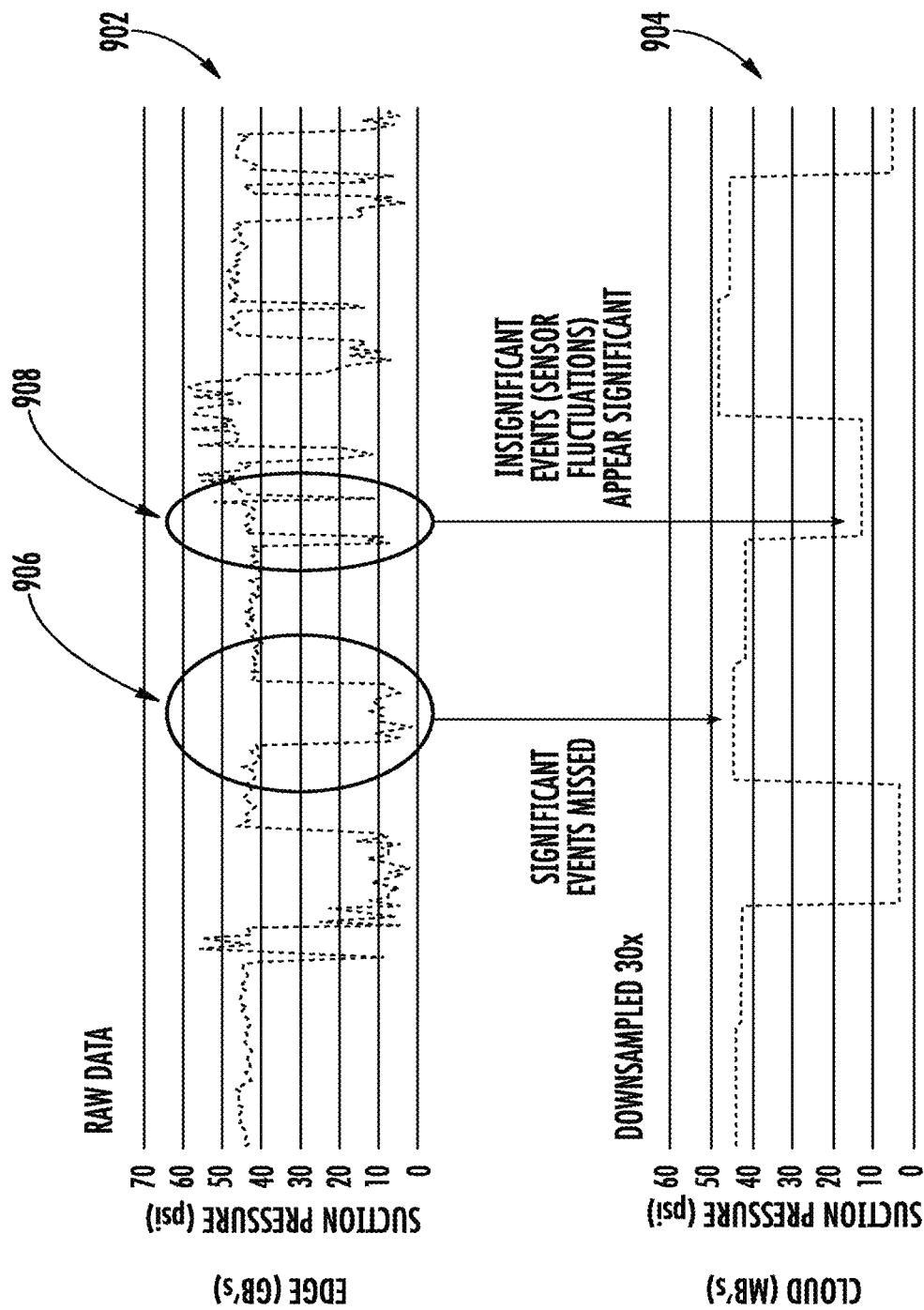
FIG. 11 shows a diagram comparing raw sensor data received at an example intelligent edge computing platform with machine learning capability platform with down sampled sensor data in the cloud illustrating event errors in the down sampled data.

FIG. 11 is a diagram that illustrates a significant advantage of applying edge-converted ML models and analytics to streaming sensor data from a local network at the network edge rather than in the cloud. The upper portion of the diagram 902 illustrates an exemplary stream of raw suction pressure data produced by a pressure sensor in a local network over a period of time. Over the period of time represented, the volume of data produced by the sensor and received at the edge in real-time could be in the gigabytes (GB's) for a sensor with a typical data rate.

Assuming an Internet connection from the local network to the cloud is even available, bandwidth may be limited or may be expensive. Accordingly, it is typical to down sample high volume local network sensor data before sending to the cloud to reduce the volume to be transmitted. As illustrated, it is not atypical to down sample the data by 30× before transmitting. The lower portion of the diagram 904 illustrates the 30× down sampled version of the raw sensor data stream from the upper portion 902. The down sampling reduces the volume of sensor data to transmit to the cloud from gigabytes to megabytes (MB's). However, the down sampling also adversely affects the fidelity of the data and can have an adverse impact on the results produced by machine learning models and other analytics.

For example, the sensor data stream of the upper diagram 902 shows a number of instances or events where the measured suction pressure drops sharply from the 40 pounds per square inch to 50 pounds per square inch range to approximately 0 to about 10 pounds per square inch. In one instance 906 the duration of the drop out is significant and could indicate a present or future issue with the operation of a pump. However, the onset and duration of the drop out happens to align with the sampling rate and duty cycle of the 30× down sampling. As such, the event is not reflected in the down sampled data stream illustrated in the lower diagram 904 and would not be detected by a machine learning model or other analytics operating on the down sampled data stream.

In another instance 908, the upper diagram illustrates the occurrence of two pressure drops of very short duration that likely reflect normal sensor fluctuations due to vibrations or other external influences and that are not significant with respect to pump operation. However, the two pressure drops happen to occur in a time window during which they are both captured by the 30× down sampling and thus result in a false-positive for a pressure drop out event being reflected in the down sampled data stream reflected in the lower diagram. This false positive would cause a machine learning model or other analytics operating on the down sampled data stream to detect a significant pressure drop out event with respect to the pump when there was none, which could cause the model to produce an inaccurate prediction or inference.

Figure 12:
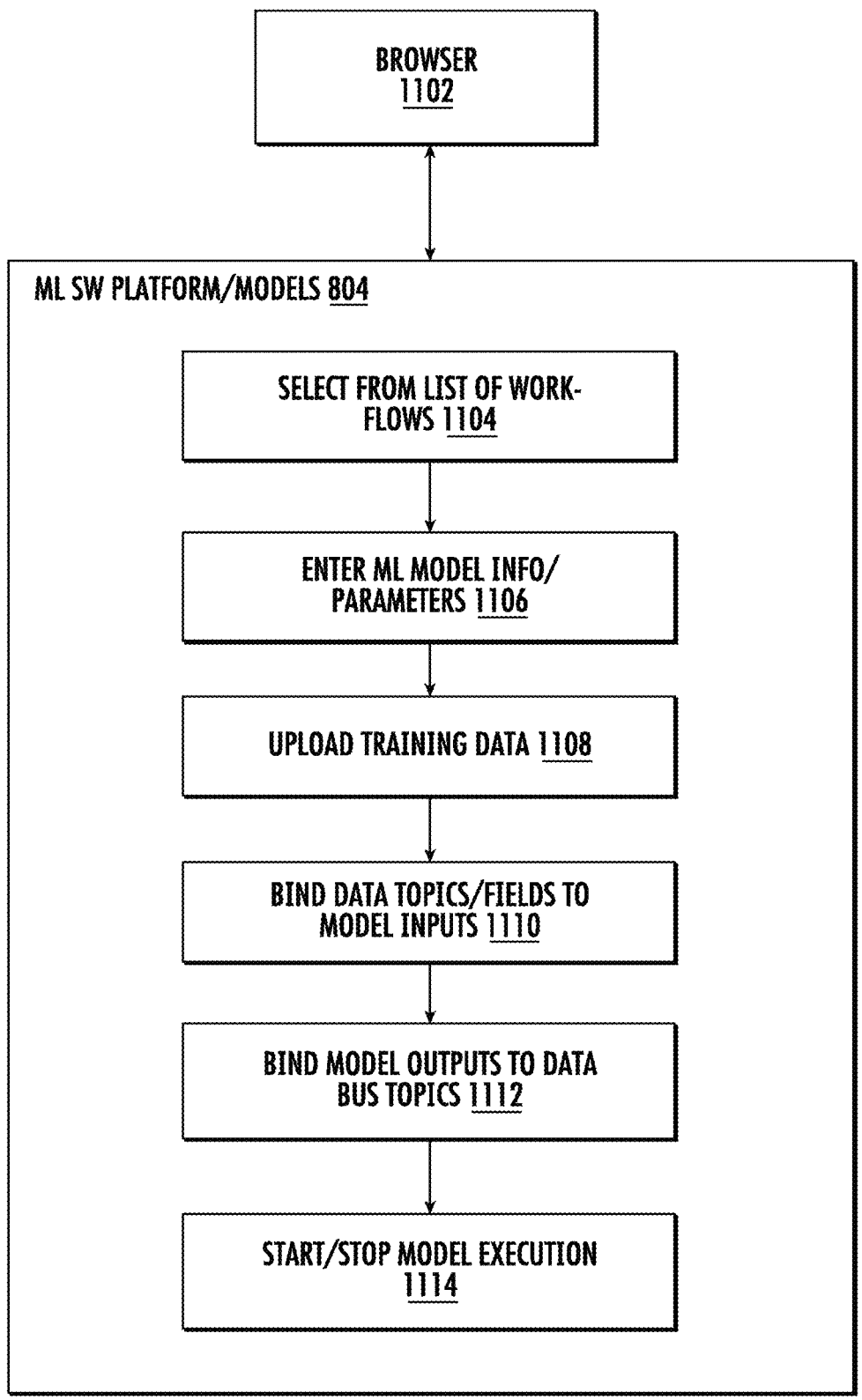
FIG. 12 shows a functional diagram illustrating use of a machine learning model software platform in accordance with an example embodiment of an intelligent edge computing platform.

FIG. 12 is a functional diagram illustrating generally the use of the machine learning model software platform 804. The machine learning model software platform may be accessed via a browser 1102, such as Microsoft Explorer, Google Chrome, or Mozilla Firefox, via an assigned IP address and port number or URL.

The machine learning model software platform presents to the browser a user interface that includes a list of workflows. Each workflow comprises one or more sensor data streams to be operated on and one or more analytics expressions, applications, machine learning models, and others. to be executed with respect to the streams in a desired sequence to achieve a desired output or set of outputs. A workflow thus defines the complete set of actions to be taken with respect to sensor data streams including ingestion, enrichment, processing and evaluation by expressions, applications, and models, the sequence in which such actions are to be taken, the inputs and outputs of individual actions, and the ultimate outputs to be published, and actions to be taken. Workflows and individual components of workflows may receive as inputs the outputs of other workflows or workflow components, and may provide outputs as inputs to other workflows or workflow components. In this way, a user can selectively chain workflows in order to create complex processing schemes.

A user can select a workflow from the list 1104 to see the details of the various components making up the workflow, which may include one or more machine learning models. A user can edit the parameters associated with a machine learning model that is already part of an existing workflow and also can identify and add a new machine learning model to an existing workflow. For example, a user can enter certain machine learning model information and parameters

1106, such as model type (e.g., regression), algorithm type (e.g., decision tree), and algorithm parameters, using the user interface. These parameters are stored in the software platform.

A user also can use the interface to upload training data 1108 to the software platform to allow the model of the selected workflow to be trained at the edge. For example, training data can be uploaded to the software platform in the form of a .csv file comprising an array with a list of data input and output names, and corresponding data values. The user may cause the model to be executed on the training data to train the model at the edge. This may be done as an alternative to or in addition to training the model in the cloud. In addition, as described above, the results of the model executing on the training data may be sent to the cloud for further tuning of the model.

A user also can use the interface to set up and initiate a model or models of the selected workflow to execute on live sensor data. Before initiating execution of a model on live sensor data, the user first uses the interface to bind sensor data topics and fields to the model inputs 1110. Preferably the user interface displays lists of sensor data topic and field names or labels and a list of the selected model's input names or labels. The user then selects corresponding sensor topics and fields and model inputs to bind or associate them. The user also binds the selected model's outputs to data bus topics 1112 in order to publish the outputs of the model on the edge platform for use by applications and others. Preferably the user interface displays a list of data bus topic names for this purpose. The user can bind the model output by simply selecting the desired data bus topics from the list. The bindings are stored in the platform with the models.

Once the model inputs and outputs are bound to sensor input topics and data bus output topics respectively, a user may initiate execution of a model on live incoming sensor data. The user interface lists available actions to be taken with respect to workflows, including delete start, stop, and edit. In order to initiate a machine learning model executing on live data, the user first selects a workflow containing the model and then selects "start" 1114. The user may stop the machine model from executing at any time by selecting the workflow and then selecting "stop."

While the model is executing as part of the selected workflow, it produces a continuous time-series stream of inferences, predictions, and others as outputs derived from the streaming sensor data inputs and any other inputs pursuant to the model definition. The model outputs are published on the data bus 532 (FIG. 5) of the edge platform and may be accessed and used in applications and analytics expressions comprising components of the same workflow of which the model is a part as well as applications and expressions comprising components of other workflows. The model outputs also may be stored and aggregated on the edge platform or transferred to the cloud, or both, as previously described.

The edge manager 547 also can be accessed via a browser, such as browser 1102, and used by a user to implement and manage machine learning models on the edge platform as part of configuring an edge platform. The edge manager incorporates a user interface that is presented to the browser 1102. The interface displays an edge management window that can be used to select and add applications, such as the machine learning model software platform 804, and machine learning models to the edge platform.

The edge management window displays several choices including "Add an App" and "Add a Model." To add the machine learning model software platform 804 to the edge platform as an application, the user would select "Add an App." The edge manager then accepts as input from the user either the name of a file containing the app from the user's computer, for example a file in .yml format, a URL at which edge users can access the application, or selection of an app previously added to the edge manager from a list the edge manager maintains and displays. If a file name is entered or selected, the file is uploaded or transferred to the edge platform over the Internet or other network connection if necessary. Alternatively, the URL of the application is saved on the edge platform and associated with the name of the application by the edge manager thus permitting the application to be accessed remotely.

To add a machine learning model to the edge platform, the user would select "Add a Model." The edge manager then accepts as input the name of the model and the file containing the model, for example a .xml or .pmml file, is uploaded to the edge platform from the user's computer. Alternatively, the user may select the model to be added from a list of models previously added to the edge manager, which the edge manager maintains and displays. To ready a machine learning model for execution on the edge platform, the user interface identifies and displays the data topics of the sensors connected to the edge platform and the names of the model's input data streams. The user binds or associates the input data streams of the model to the sensor data topics in substantially the same manner as described above with respect to the machine learning model software platform. Thereafter, the machine learning model can be added to a workflow and initiated to execute on live streaming data as described herein.

The foregoing description of exemplary embodiments has been presented for purposes of illustration and description only. Any headings therein are included solely for convenience. The foregoing description is not intended to be exhaustive or to limit the invention to the precise form or forms described, and many modifications and variations are possible in light of the teachings herein without departing from the spirit and scope of the invention. The embodiments herein were chosen and described in order to best explain the principles of the invention and some of its practical applications. This description will enable others skilled in the art to best utilize and practice the invention in various embodiments and with various modifications as are suited to a particular use or application. It is thus intended that the scope of the invention be defined by the following claims.

What is claimed is:

1. A method comprising:
providing an edge platform connected to a local network between a plurality of sensors and a remote network;
using an edge converter creating an edge-converted machine learning model;
providing the edge-converted machine learning model on the edge platform;
receiving a continuous stream of first sensor data from a first sensor of the plurality of sensors at the edge platform;
at the edge platform without first transmitting the continuous stream of first sensor data to the remote network for processing:
executing the edge-converted machine learning model at least partially in a complex event processing engine to operate on the continuous stream of first sensor data in real-time to produce a stream of first inferences about a first network device of a plurality of network devices, the stream of first inferences comprising a stream of a plurality of inferences; and determining based on the stream of first inferences whether to take an action without first communicating the stream of first inferences to the remote network, wherein the action includes altering operation parameters of one or more devices associated with the edge platform.

2. The method of claim 1, wherein the edge-converted machine learning model comprises analytics expressions of an analytics expression language that are operable to process streams of data in real-time.

3. The method of claim 2, wherein creating the edge-converted machine learning model comprises:
converting a non-edge-based machine learning model to an intermediate form adapted for deployment; and
translating the intermediate form of the non-edge-based machine learning model into a script of the analytics expressions of the analytics expression language.

4. The method of claim 2, wherein:
a non-edge-based machine learning model comprises a data pre-processing component; and
creating the edge-converted machine learning model comprises removing the data pre-processing component and replacing it with equivalent expressions of the analytics expression language that are executable in the complex event processing engine separately from the edge-converted machine learning model.

5. The method of claim 4, wherein:
the non-edge-based machine learning model comprises a data post-processing component; and
and creating the edge-converted machine learning model comprises removing the data post-processing component and replacing it with equivalent expressions of the analytics expression language that are executable in the complex event processing engine separately from the edge-converted machine learning model.

6. The method of claim 2, comprising:
in response to a trigger, transmitting one or more inferences from the plurality of inferences and one or more data values from the continuous stream of first sensor data to the remote network;
applying a non-edge based machine learning model to the one or more data values and producing one or more second inferences;
comparing the one or more second inferences with the one or more inferences from the plurality of inferences;
based on the comparison, generating a modified edge-converted machine learning model; and
updating the edge-converted machine learning model on the edge platform with the modified edge-converted machine learning model.

7. The method of claim 6, comprising:
executing expressions of the analytics expression language in the complex event processing engine on the stream of first inferences;
generating over time a characteristic of the first inferences;
comparing the characteristic to a value corresponding to a predetermined level of unacceptable accuracy of the edge-converted machine learning model; and
creating the trigger based on the comparing.

8. The method of claim 6, wherein updating the edge-converted machine learning model with the modified edge-converted machine learning model comprises:
generating a continuous model stream representing the edge-converted machine learning model;
streaming the continuous model stream along with the continuous stream of first sensor data on the edge platform;
receiving at the edge platform the modified edge-converted machine learning model;
inserting the modified edge-converted machine learning model into the continuous model stream;
detecting a change in the continuous model stream as the modified edge-converted machine learning model propagates in the continuous model stream;
in response to detecting the change in the continuous model stream instantiating an instance of the modified edge-converted machine learning model; and
using the instantiated instance of the modified edge-converted machine learning model to operate on the continuous stream of first sensor data and produce the stream of first inferences in place of the edge-converted machine learning model.

9. The method of claim 2, comprising:
using the edge converter creating a plurality of edge-converted machine learning models operable in real-time on the continuous stream of first sensor data from a plurality of non-edge-based machine learning models trained and operable in non-real-time on aggregated static sensor data;
wherein each of the plurality of non-edge-based machine learning models includes a different type of machine learning model represented in a different high-level model language;
wherein creating the plurality of edge-converted machine learning models includes converting each of the plurality of non-edge-based machine learning models to a script of expressions of the same analytics expression language adapted for execution in the complex event processing engine of the edge platform on the continuous stream of first sensor data in real-time; and
providing the plurality of edge-converted machine learning models on the edge platform.

10. The method of claim 1, wherein:
a non-edge-based machine learning model is operable to recognize particular semantics in aggregated static sensor data; and
the edge-converted machine learning model is operable to recognize the particular semantics in the continuous stream of first sensor data in real-time.

11. The method of claim 1, wherein creating the edge-converted machine learning model comprises:
parsing a non-edge-based machine learning model and identifying computations it contains for aggregated static data;
building in a memory a computation flow graph representation including the identified computations;
optimizing the identified computations and the computation flow represented in the computation flow graph for real-time operation on the continuous stream of first streaming sensor data; and
incorporating the optimized computations and computation flow in the edge-converted machine learning model.

12. The method of claim 1, wherein creating the edge-converted machine learning model comprises:
verifying the edge-converted machine learning model produces accurate results compared to a non-edge-based machine learning module for a given set of data values.

13. The method of claim 1, wherein verification comprises:
parsing model verification tags from a non-edge-based machine learning module;
extracting from the non-edge-based machine learning module a first set of input data values and a first set of expected output data values corresponding to the model verification tags;
converting the first set of input data values and expected output data values to a second set of input data values and a second set of expected output data values respectively in a form compatible with the edge-converted machine learning model;
executing the edge-converted machine learning model on the second set of input data values and producing a set of actual output data values; and
comparing the set of actual output data values and the second set of expected output data values.

14. The method of claim 1, wherein:
the remote network comprises a cloud manager;
the edge platform comprises an edge manager; and
providing the edge-converted machine learning model on the edge platform comprises the edge manager receiving the edge-converted machine learning model directly from the cloud manager.

15. The method of claim 1, comprising:
providing an app store intermediate the remote network and the edge platform;
wherein providing the edge-converted machine learning model on the edge platform comprises transferring the edge-converted machine learning model from the remote network to the app store and retrieving the edge-converted machine learning model from the app store to the edge platform.

16. A method comprising:
providing an edge platform connected to a local network between a plurality of sensors and a remote network;
using an edge converter to create an edge-converted machine learning model from a non-edge-based machine learning model that is trained and operable in non-real-time on aggregated static sensor data;
providing on the edge platform the edge-converted machine learning model that is optimized to operate with computing resources of the edge platform in real-time on one or more streams of sensor data and produce one or more streams of inferences;
receiving a continuous stream of first sensor data from a first sensor of the plurality of sensors at the edge platform;
without first transmitting the continuous stream of first sensor data to the remote network for processing:
executing the edge-converted machine learning model using the computing resources of the edge platform to operate on the continuous stream of first sensor data in real-time to produce a stream of first inferences about a first network device of a plurality of network devices, the stream of first inferences comprising a stream of a plurality of inferences; and
determining based on the stream of first inferences whether to take an action regarding the first network device without first communicating the stream of first inferences to the remote network, wherein the action includes altering operation parameters of one or more devices associated with the edge platform.

17. One or more non-transitory computer readable media containing program instructions that, when executed by one or more processors, cause the one or more processors to perform operations comprising:
providing on an edge platform of a distributed network an edge-converted machine learning model adapted to operate on a continuous stream of data in real-time and to produce a continuous stream of inferences in real-time;
receiving at the edge platform a first sensor data stream from a first sensor;
at the edge platform without first transmitting the first sensor data stream to a remote network for processing:
operating on the first sensor data stream with the edge-converted machine learning model and producing a stream of first inferences about a first network device;
determining based on the stream of first inferences whether to take an action affecting the first network device, wherein the action includes altering operation parameters of one or more devices associated with the edge platform; and
updating the edge-converted machine learning model on the edge platform without interrupting the operating on the first sensor data stream or the producing the stream of first inferences, wherein the updating comprises:
generating a continuous model stream representing the edge-converted machine learning model;
inserting the modified edge-converted machine learning model into the model stream;
detecting a change in the model stream corresponding to the modified edge-converted machine learning model as the modified machine learning model propagates in the model stream;
in response to detecting the change in the model stream, instantiating an instance of the modified edge-converted machine learning model on the edge platform; and
using the instantiated instance of the modified edge-converted machine learning model to operate on the first sensor data stream and produce the stream of first inferences.

18. The non-transitory computer readable media of claim 17, wherein detecting the change in the model stream and instantiating an instance of the modified edge-converted machine learning model comprise:
using a stateful subsystem to detect the change in the model stream in real-time;
in response to the stateful subsystem detecting the change, triggering an actor that understands the semantics of the model stream, wherein the actor:
reads the modified edge-converted machine learning model from the model stream and instantiates the instance of the modified edge-converted machine learning model;
couples the instantiated instance of the modified edge-converted machine learning model to the same semantics of the first sensor data stream as the edge-converted machine learning model; and
inserts the instantiated instance of the modified edge-converted machine learning model back into the model stream.

19. The non-transitory computer readable media of claim 17, wherein the edge platform has an edge manager, the remote network has a cloud manager, and providing the modified edge-converted machine learning model on the edge platform comprises the edge manager receiving the modified edge-converted machine learning model directly from the cloud manager.

20. The non-transitory computer readable media of claim 17, comprising an app store intermediate the edge platform and the remote network, and wherein providing the modified edge-converted machine learning model on the edge platform comprises retrieving the modified edge-converted machine learning model from the app store.

* * * * *